US010534241B2

(12) United States Patent
Nishijima et al.

(10) Patent No.: US 10,534,241 B2
(45) Date of Patent: Jan. 14, 2020

(54) BLADE OPENING/CLOSING APPARATUS AND IMAGE PICKUP APPARATUS

(71) Applicant: SONY CORPORATION, Tokyo (JP)

(72) Inventors: Takuya Nishijima, Tokyo (JP); Hideo Ohkuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,568

(22) PCT Filed: Jan. 13, 2017

(86) PCT No.: PCT/JP2017/001077
§ 371 (c)(1),
(2) Date: Jul. 27, 2018

(87) PCT Pub. No.: WO2017/149953
PCT Pub. Date: Sep. 8, 2017

(65) Prior Publication Data
US 2019/0041724 A1 Feb. 7, 2019

(30) Foreign Application Priority Data
Mar. 1, 2016 (JP) .................. 2016-039252

(51) Int. Cl.
G03B 9/06 (2006.01)
G03B 9/10 (2006.01)
(Continued)

(52) U.S. Cl.
CPC ............. G03B 9/06 (2013.01); G02B 5/005 (2013.01); G03B 9/10 (2013.01); G03B 9/22 (2013.01); H04N 5/2254 (2013.01)

(58) Field of Classification Search
None
See application file for complete search history.

(56) References Cited

U.S. PATENT DOCUMENTS 3,733,991 A * 5/1973 Kobayashi ............... G03B 9/22
396/449
3,871,012 A * 3/1975 Haraguchi ............... G03B 9/18
396/454

(Continued)

FOREIGN PATENT DOCUMENTS

JP 55-159419 A 12/1980
JP 56-126629 U 9/1981
(Continued)

OTHER PUBLICATIONS

International Search Report and Written Opinion of PCT Application No. PCT/JP2017/001077, dated Apr. 4, 2017, 10 pages of English Translation and 08 pages of ISRWO.

Primary Examiner — William B Perkey
(74) Attorney, Agent, or Firm — Chip Law Group

(57) ABSTRACT

Miniaturization by simplification of a structure is achieved while suppressing a bound of an opening/closing blade and securing improvement of functionality. A blade opening/closing apparatus includes: a base body that includes an aperture; a driving body that is movably supported by the base body and is operated by a driving force of a drive source; an opening/closing blade that is moved by an operation of the driving body and opens/closes the aperture; and a braking body that controls a movement speed of the opening/closing blade via the driving body, the driving body including, on one surface thereof, an engagement portion that is to be engaged with the opening/closing blade and transmits the driving force to the opening/closing blade, the driving body including, on another surface thereof, a braked portion to which a braking force of the braking body is to be applied.

21 Claims, 21 Drawing Sheets

(51) Int. Cl.
*G02B 5/00* (2006.01)
*G03B 9/22* (2006.01)
*H04N 5/225* (2006.01)

(56) References Cited

U.S. PATENT DOCUMENTS

| | | | | |
|---|---|---|---|---|
| 3,956,761 | A * | 5/1976 | Koch | G03B 9/08 396/496 |
| 4,054,892 | A * | 10/1977 | Nakagawa | G03B 9/18 396/454 |
| 4,166,685 | A * | 9/1979 | Hashimoto | G03B 9/22 396/460 |
| 4,268,147 | A * | 5/1981 | Date | G03B 9/18 396/195 |
| 4,284,339 | A * | 8/1981 | Borowski | G03B 7/083 396/243 |
| 4,322,145 | A * | 3/1982 | Yamada | G03B 9/22 396/235 |
| 4,408,859 | A * | 10/1983 | Fukahori | G03B 9/08 396/246 |
| 4,434,747 | A * | 3/1984 | Chadshay | F23D 23/00 110/261 |
| 5,598,244 | A * | 1/1997 | Johansson | G03B 9/18 396/358 |
| 5,664,247 | A * | 9/1997 | Hasuda | G03B 9/08 396/456 |
| 8,956,059 | B1 * | 2/2015 | Stephenson | G03B 9/10 396/463 |
| 2005/0063698 | A1 * | 3/2005 | Usuda | G03B 9/40 396/489 |
| 2008/0193122 | A1 * | 8/2008 | Yamaguchi | G03B 9/08 396/456 |
| 2011/0242636 | A1 * | 10/2011 | Viglione | G03B 9/10 359/234 |
| 2012/0141109 | A1 * | 6/2012 | Qian | B82Y 30/00 396/453 |
| 2019/0041724 | A1 * | 2/2019 | Nishijima | G02B 5/005 |

FOREIGN PATENT DOCUMENTS

| | | |
|---|---|---|
| JP | 58-166932 U | 11/1983 |
| JP | 60-012533 A | 1/1985 |
| JP | 62-111241 A | 5/1987 |
| JP | 2008-131554 A | 6/2008 |
| JP | 2008-249814 A | 10/2008 |

* cited by examiner

BLADE OPENING/CLOSING APPARATUS AND IMAGE PICKUP APPARATUS

CROSS REFERENCE TO RELATED APPLICATIONS

This application is a U.S. National Phase of International Patent Application No. PCT/JP2017/001077 filed on Jan. 13, 2017, which claims priority benefit of Japanese Patent Application No. JP 2016-039252 filed in the Japan Patent Office on Mar. 1, 2016. Each of the above-referenced applications is hereby incorporated herein by reference in its entirety.

TECHNICAL FIELD

The present technology relates to a technical field regarding a blade opening/closing apparatus that has a structure of controlling a movement speed of an opening/closing blade, and an image pickup apparatus including the blade opening/closing apparatus.

CITATION LIST

Patent Literature

Patent Literature 1: Japanese Patent Application Laid-open No. Sho 55-159419
Patent Literature 2: Japanese Utility Model Application Laid-open No. Sho 56-126629

BACKGROUND ART

In various image pickup apparatuses such as a video camera and a still camera, an optical system including a lens group, an optical device, and the like therein and an image pickup device that photoelectrically converts light taken in by the optical system are arranged. In such an image pickup apparatus, there is a type in which light enters an image pickup device via a shutter apparatus or the like that functions as a blade opening/closing apparatus at a time a subject is photographed.

As the blade opening/closing apparatus, there is a type that includes a base body having an aperture formed therein, an opening/closing blade that is moved with respect to the base body, and a driving body that causes the opening/closing blade to move, and the driving body is operated by a driving force of a drive source, so that the opening/closing blade is moved so as to open/close the aperture between an opening position and a closing position.

In such a blade opening/closing apparatus, there is a type that includes a braking mechanism to control a movement speed of the opening/closing blade (see, for example, Patent Literature 1 and Patent Literature 2).

The blade opening/closing apparatus described in Patent Literature 1 is configured such that a rotatable coupling ring that functions as a driving body includes a projection, the projection comes into contact with a bias spring, a bias force having a magnitude corresponding to a rotation position of the coupling ring is applied from the bias spring, and a rotation speed of the coupling ring is lowered.

The blade opening/closing apparatus described in Patent Literature 2 is configured such that a rotatable sector ring that functions as a driving body includes a brake pin and a bifurcated brake lever for which a magnitude of a turning force is controlled by a spring washer, and when the driving body is rotated, the brake pin comes into contact with the brake lever and the rotation speed of the sector ring is lowered.

In such a manner, the blade opening/closing apparatuses described in Patent Literature 1 and Patent Literature 2 each include a braking mechanism that lowers the rotation speed of the driving body, and immediately before the opening/closing blade reaches the closing position from the opening position and immediately before the opening/closing blade reaches the opening position from the closing position, a braking force is applied to the opening/closing blade via the driving body. By application of the braking force to the opening/closing blade, a bound by a reaction caused after the opening/closing blade is moved to the closing position or the opening position less easily occurs, and the opening/closing blade can be stably held at the closing position and the opening position.

DISCLOSURE OF INVENTION

Technical Problem

As described above, in the image pickup apparatus, the bound of the opening/closing blade is suppressed to prevent re-exposure, so that the quality of a photographed image is improved. Meanwhile, in recent years, miniaturized types excellent in portability have been dramatically diffused, and further miniaturization is expected in the future. Therefore, also in the internal structure of the image pickup apparatus including the blade opening/closing apparatus, it is desirable to achieve simplification of the structure by effectively using spaces in the inner space and to secure further miniaturization of the image pickup apparatus.

In this regard, a blade opening/closing apparatus and image pickup apparatus according to the present technology aim at overcoming the problems described above and achieving miniaturization by simplification of a structure while suppressing a bound of an opening/closing blade and securing improvement of functionality.

Solution to Problem

Firstly, a blade opening/closing apparatus according to the present technology includes: a base body that includes an aperture; a driving body that is movably supported by the base body and is operated by a driving force of a drive source; an opening/closing blade that is moved by an operation of the driving body and opens/closes the aperture; and a braking body that controls a movement speed of the opening/closing blade via the driving body, the driving body including, on one surface thereof, an engagement portion that is to be engaged with the opening/closing blade and transmits the driving force to the opening/closing blade, the driving body including, on another surface thereof, a braked portion to which a braking force of the braking body is to be applied.

Accordingly, the engagement portion that transmits the driving force to the opening/closing blade is provided to the one surface of the driving body, and the braked portion to which the braking force of the braking body is to be applied is provided to the other surface of the driving body.

Secondly, in the blade opening/closing apparatus described above, it is desirable that the opening/closing blade is moved between an opening position at which the aperture is opened and a closing position at which the aperture is closed, and the braking force is applied to the braked portion from the braking body at a part of a zone between the opening position and the closing position. Accordingly, since a non-braked zone in which the braking force is not applied to the opening/closing blade exists in the zone between the opening position and the closing position, a movement speed of the opening/closing blade is not lowered in the non-braked zone.

Thirdly, in the blade opening/closing apparatus described above, it is desirable that the braking force is applied to the braked portion from the braking body at an end portion of the zone on a closing position side.

Accordingly, since the braking force is applied to the braked portion from the braking body and the movement speed of the opening/closing blade is lowered as the opening/closing blade approaches the closing position, the opening/closing blade is moved to the closing position at low speed, and after being moved to the closing position, the opening/closing blade is less easily moved toward the opening position by a reaction.

Fourthly, in the blade opening/closing apparatus described above, it is desirable that the braking force is applied to the braked portion from the braking body at an end portion of the zone on an opening position side.

Accordingly, since the braking force is applied to the braked portion from the braking body and the movement speed of the opening/closing blade is lowered as the opening/closing blade approaches the opening position, the opening/closing blade is moved to the opening position at low speed, and after being moved to the opening position, the opening/closing blade is less easily moved toward the closing position by a reaction.

Fifthly, in the blade opening/closing apparatus described above, it is desirable that a cam pin is provided as the engagement portion, and a braked pin is provided as the braked portion, the braked pin protruding in a direction opposite to the cam pin.

Accordingly, either one of the engagement portion and the braked portion is formed in a pin shape.

Sixthly, in the blade opening/closing apparatus described above, it is desirable that the engagement portion and the braked portion are integrally provided to the driving body.

Accordingly, the cam pin and the braked pin are integrally provided as a part of the driving body.

Seventhly, in the blade opening/closing apparatus described above, it is desirable that the driving body is formed in an annular shape, and the driving body is rotatably supported by the base body on an outer circumferential side of the aperture.

Accordingly, since the annular driving body is positioned on the outer circumferential side of the aperture and is rotated there, a space that is larger than the arrangement space of the driving body in the base body does not need to be formed as a moving space of the driving body.

Eighthly, in the blade opening/closing apparatus described above, it is desirable that a plurality of opening/closing blades are provided, at least a part of each of the plurality of opening/closing blades is movable with respect to the base body on an outer circumferential side of the aperture, and the aperture is opened/closed by the plurality of opening/closing blades moving in a direction in which the plurality of opening/closing blades are set apart from the center of the aperture.

Accordingly, at least a part of each of the plurality of opening/closing blades is positioned on the outer circumferential side of the aperture and is moved.

Ninthly, in the blade opening/closing apparatus described above, it is desirable that the base body includes a plurality of stopper portions that restrict movements of the plurality of opening/closing blades, and when the plurality of opening/closing blades simultaneously come into contact with the plurality of stopper portions, the movements of the plurality of opening/closing blades are restricted.

Accordingly, loads to be applied to the opening/closing blades from the stopper portions at the time of stop are dispersed to the plurality of opening/closing blades.

Tenthly, in the blade opening/closing apparatus described above, it is desirable that the opening/closing blades are moved between the opening position at which the aperture is opened and the closing position at which the aperture is closed, a first stopper portion that stops the opening/closing blades at the opening position and a second stopper portion that stops the opening/closing blades at the closing position are provided as the plurality of stopper portions, and the first stopper portion and the second stopper portion are alternately provided on an outer circumferential portion of the base body in a circumferential direction.

Accordingly, all of the stopper portions are positioned at the outer circumferential portion of the base body.

Eleventhly, in the blade opening/closing apparatus described above, it is desirable that the braking body includes a control member that is movably supported by the base body and a bias spring that biases the control member, and when the braked portion comes into contact with the control member, a bias force of the bias spring as a braking force is applied to the braked portion via the control member.

Accordingly, the braking force is applied to the braked portion brought into contact with the control member from the bias spring via the control member, and the braking force is transmitted to the opening/closing blade from the driving body.

Twelfthly, in the blade opening/closing apparatus described above, it is desirable that the control member is slidably supported by the base body.

Accordingly, the control member is caused to slide and the braking force is applied to the opening/closing blade via the driving body.

Thirteenthly, in the blade opening/closing apparatus described above, it is desirable that the driving body is rotatably supported by the base body, and a sliding direction of the control member is set to a direction tangent to a rotation direction of the driving body.

Accordingly, the control member is caused to slide in the tangent direction and the braking force is applied to the opening/closing blade via the driving body.

Fourteenthly, in the blade opening/closing apparatus described above, it is desirable that the bias force applied from the bias spring is increased as the control member approaches both ends of the bias spring in a movement direction.

Accordingly, the braking force increases as the amount of movement of the opening/closing blade increases.

Fifteenthly, in the blade opening/closing apparatus described above, it is desirable that paired plate springs that are positioned to face each other are used as the bias spring, both end portions of the paired plate springs in a longitudinal direction are connected to the base body, the control member includes pressed portions to which the paired plate springs are pressed from opposite sides, and the bias force in a direction in which the paired plate springs approach each other is applied to the control member.

Accordingly, the bias force applied to the control member from the bias spring increases as the control member approaches both the ends of the bias spring in the movement direction.

Sixteenthly, in the blade opening/closing apparatus described above, it is desirable that the control member is rotatably supported by the base body.

Accordingly, an operating space of the control member is made small.

Seventeenthly, in the blade opening/closing apparatus described above, it is desirable that the braking body includes a control member that is movably supported by the base body and a viscous material that applies viscous resistance to the control member, and when the braked portion comes into contact with the control member, the viscous resistance of the viscous material as a braking force is applied to the braked portion via the control member.

Accordingly, the braking force is applied to the braked portion brought into contact with the control member from the viscous material via the control member and is transmitted from the driving body to the opening/closing blade.

Eighteenthly, in the blade opening/closing apparatus described above, it is desirable that the control member is slidably supported by the base body.

Accordingly, the control member is caused to slide, and the braking force is applied to the opening/closing blade via the driving body.

Nineteenthly, in the blade opening/closing apparatus described above, it is desirable that the control member is rotatably supported by the base body.

Accordingly, an operating space of the control member is made small.

Twentiethly, an image pickup apparatus according to the present technology includes: a blade opening/closing apparatus that controls light taken in inside via an optical system; and an image pickup device that photoelectrically converts the light taken in via the optical system, the blade opening/closing apparatus including a base body that includes an aperture, a driving body that is movably supported by the base body and is operated by a driving force of a drive source, an opening/closing blade that is moved by an operation of the driving body and opens/closes the aperture, and a braking body that controls a movement speed of the opening/closing blade via the driving body, the driving body including, on one surface thereof, an engagement portion that is to be engaged with the opening/closing blade and transmits the driving force to the opening/closing blade, the driving body including, on another surface thereof, a braked portion to which a braking force of the braking body is to be applied.

Accordingly, in the blade opening/closing apparatus, the engagement portions that transmit the driving force to the opening/closing blade are provided to the one surface of the driving body, and the braked portion to which the braking force of the braking body is to be applied is provided to the other surface of the driving body.

ADVANTAGEOUS EFFECTS OF INVENTION

According to the present technology, since the engagement portions that transmit the driving force to the opening/closing blade are provided to the one surface of the driving body, and the braked portion to which the braking force of the braking body is to be applied is provided to the other surface of the driving body, simplification of the structure is achieved by effectively using spaces in the inner space of the blade opening/closing apparatus, and miniaturization by the simplification of the structure can be achieved while suppressing the bounds of the opening/closing blades and securing improvement in functionality.

It should be noted that the effects described in the specification are mere examples and should not be limited, and other effects may also be obtained.

BRIEF DESCRIPTION OF DRAWINGS

FIG. 8 An exploded perspective view showing a braking body and the like.

FIG. 9 A perspective view showing the braking body and the like.

MODES FOR CARRYING OUT THE INVENTION

Hereinafter, modes for embodying the present technology will be described with reference to the attached drawings.

In an embodiment to be described below, an image pickup apparatus according to the present technology is applied to a still camera, and a blade opening/closing apparatus according to the present technology is applied to a shutter apparatus provided in this still camera.

It should be noted that an application range of the present technology is not limited to the still camera and the shutter apparatus provided in the still camera, and the present technology is widely applicable to various image pickup apparatuses incorporated in video cameras and other apparatuses and various blade opening/closing apparatuses provided in these image pickup apparatuses, such as an iris.

In descriptions below, front and back, upper and lower, and right- and left-hand directions will be indicated by directions viewed from a photographer during photographing using a still camera. Therefore, a subject side becomes the front side, and a photographer side becomes the rear side.

It should be noted that the front and back, upper and lower, and right- and left-hand directions indicated below are used for convenience of explanation, and the directions are not limited to these directions regarding implementation of the present technology.

Further, a lens group to be described below may include, in addition to a lens group including one or a plurality of lenses, a lens group including the one or plurality of lenses and other optical devices such as an iris.

<Schematic Configuration of Image Pickup Apparatus>

First, a schematic configuration of the image pickup apparatus will be described (see FIGS. 1 to 3).

Figure 1:
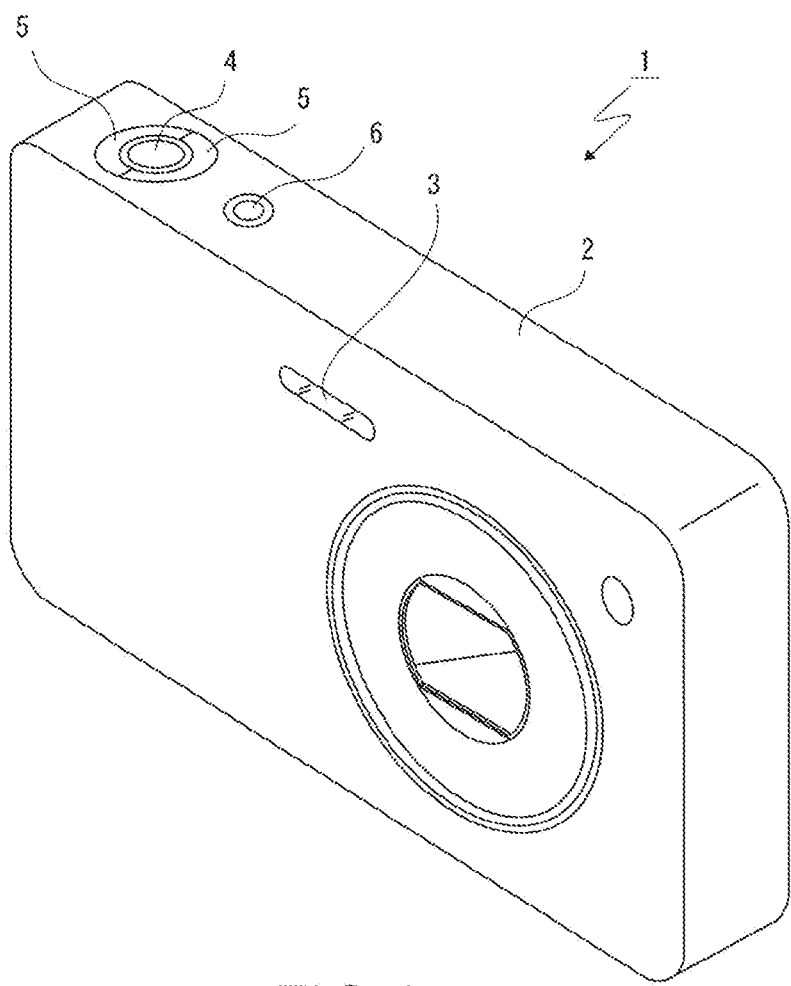
FIG. 1 A perspective view showing an embodiment of a blade opening/closing apparatus and image pickup apparatus according to the present technology together with FIGS. 2 to 25, this view showing the image pickup apparatus.
Figure 2:
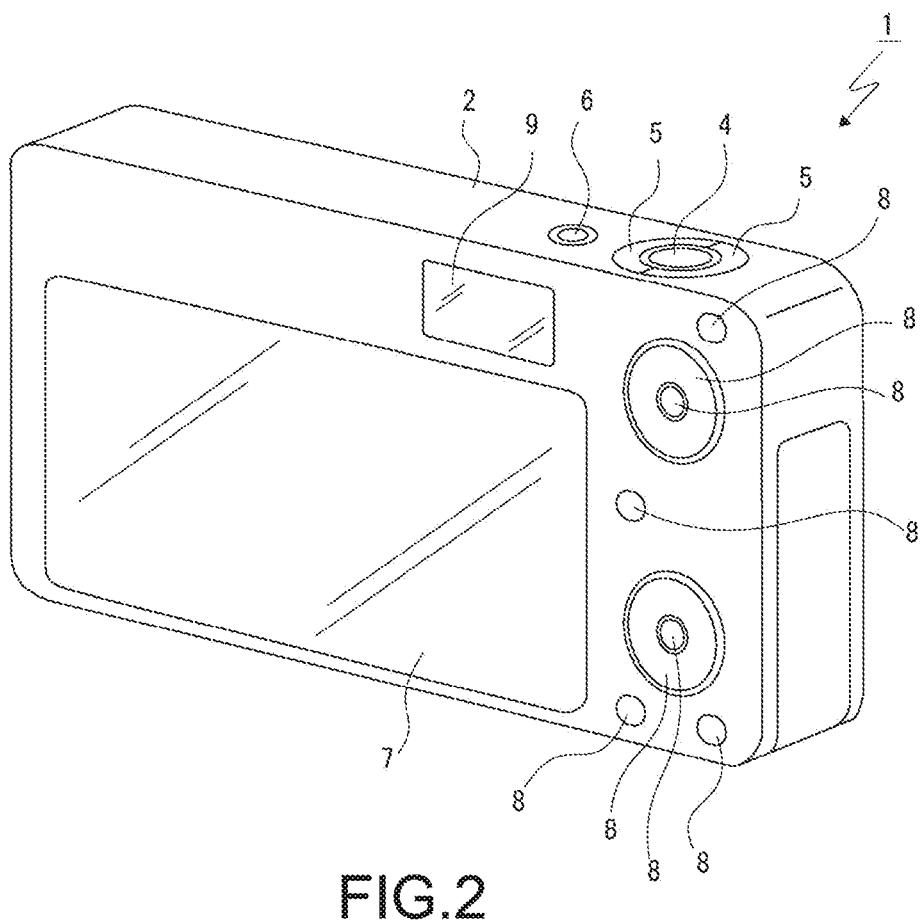
FIG. 2 A perspective view showing the image pickup apparatus viewed from a direction different from that of FIG. 1.

As shown in FIGS. 1 and 2, in an image pickup apparatus 1, for example, required portions are arranged inside and outside a horizontally-long flat casing 2. The image pickup apparatus 1 may be an apparatus to/from which an interchangeable lens (not shown) can be attached/detached or may be an apparatus in which attachment/detachment of the interchangeable lens is not performed.

A flash 3 is provided on a front surface of the casing 2. A shutter button 4, a zoom switch 5, and a power button 6 are provided on an upper surface of the casing 2 (see FIGS. 1 and 2). A display 7, various operation portions 8, 8, . . . , and a finder 9 are provided on a rear surface of the casing 2.

Figure 3:
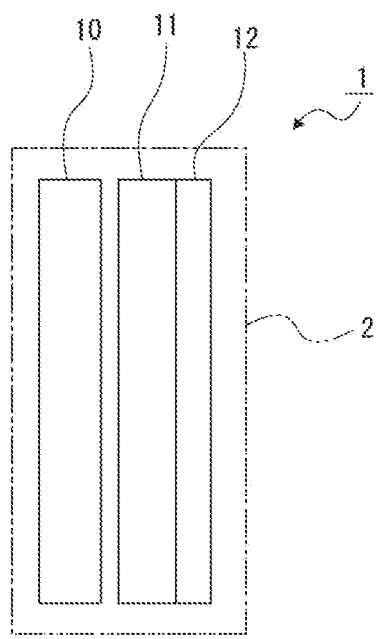
FIG. 3 A schematic side view of the image pickup apparatus.

As shown in FIG. 3, inside the casing 2, an optical system 10 including a lens group, an optical device, and the like, a blade opening/closing apparatus 11 that controls an amount of light taken in by the optical system 10, and an image pickup device 12 that photoelectrically converts the light taken in via the blade opening/closing apparatus 11 are arranged sequentially from the front side.

It should be noted that in the case of the image pickup apparatus 1 to/from which an interchangeable lens can be attached/detached, the blade opening/closing apparatus 11 may be provided inside the casing 2 or inside the interchangeable lens. Further, the interchangeable lens may be used as an image pickup apparatus, or the image pickup apparatus may be configured by attaching the interchangeable lens to the casing 2.

<Configuration of Blade Opening/Closing Apparatus>

Hereinafter, a configuration of the blade opening/closing apparatus 11 will be described (see FIGS. 4 to 17).

Figure 4:
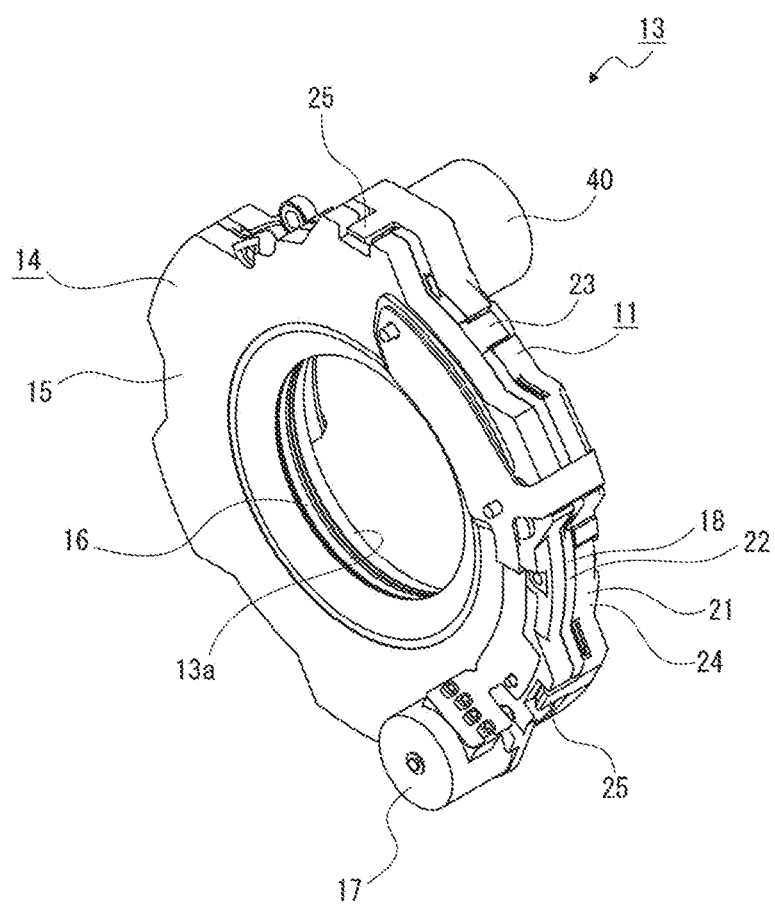
FIG. 4 A perspective view of an optical unit.

The blade opening/closing apparatus 11 is configured as, for example, a part of the optical unit 13 (see FIG. 4). However, the blade opening/closing apparatus 11 does not need to be configured as a part of the optical unit 13, and the whole of the blade opening/closing apparatus 11 may be configured as a single unit.

The optical unit 13 includes the blade opening/closing apparatus 11 and a diaphragm apparatus 14 positioned in front of the blade opening/closing apparatus 11. The optical unit 13 is formed in a substantially annular shape as a whole, and the inside space thereof is formed as a light transmission hole 13a.

The diaphragm apparatus 14 includes an annular diaphragm base plate 15, an annular diaphragm ring 16 rotatably supported by the diaphragm base plate 15, and a plurality of diaphragm blades (not shown) moved in conjunction with a rotating operation of the diaphragm ring 16. The diaphragm base plate 15, the diaphragm ring 16, and the plurality of diaphragm blades are arranged sequentially from the front side. A diaphragm motor 17 is attached to a front surface of the diaphragm base plate 15, and the diaphragm ring 16 is rotated by a driving force of the diaphragm motor 17.

Figure 5:
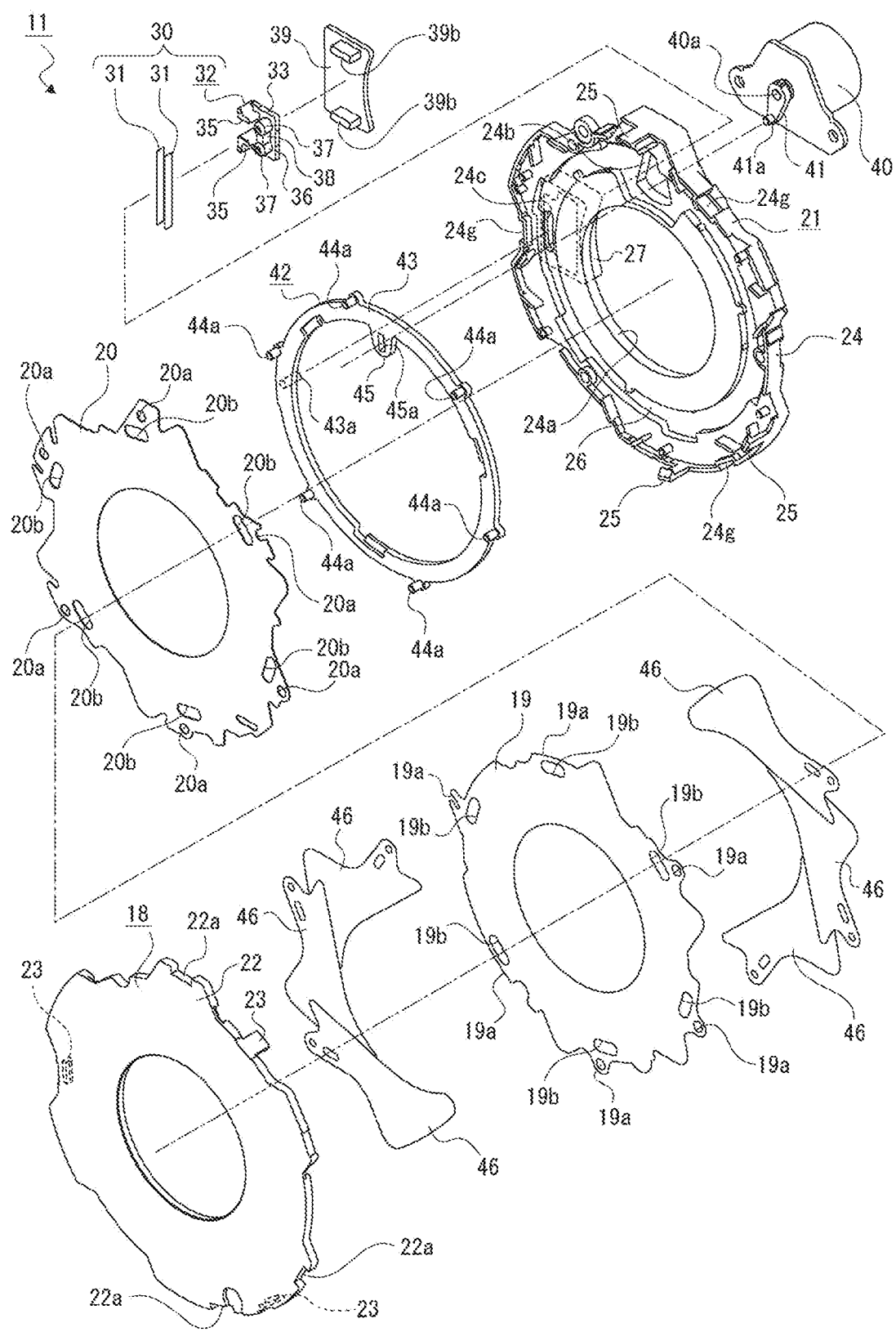
FIG. 5 An exploded perspective view of the blade opening/closing apparatus.

The blade opening/closing apparatus 11 includes a presser plate 18, a first sheet 19, a second sheet 20, and a base body 21 that are arranged sequentially from the front side (see FIGS. 4 and 5).

The presser plate 18 includes an annular surface portion 22 formed in a substantially annular shape and lock piece portions 23, 23, 23 protruding rearwardly from an outer circumferential portion of the annular surface portion 22. The lock piece portions 23, 23, 23 are provided while being set apart from each other in a circumferential direction. On an outer circumferential surface of the annular surface portion 22, engagement concave grooves 22a, 22a, 22a that are opened in the front-back direction and outwardly are formed while being set apart from each other in the circumferential direction.

The first sheet 19 is formed in an annular shape and includes insertion portions 19a, 19a, . . . and pin insertion portions 19b, 19b, . . . that are formed while being set apart from each other in a circumferential direction. The insertion portion 19a and the pin insertion portion 19b are positioned adjacent to each other. The insertion portions 19a, 19a, . . . are notches or holes. The pin insertion portion 19b is formed in a gentle arc shape.

The second sheet 20 is formed in an annular shape and includes shaft insertion portions 20a, 20a, . . . and pin insertion portions 20b, 20b, . . . that are formed while being set apart from each other in a circumferential direction. The shaft insertion portion 20a and the pin insertion portion 20b are positioned adjacent to each other. The shaft insertion portion 20a is a notch or hole. The pin insertion portion 20b is a hole formed in a gentle arc shape.

The base body 21 includes a base surface portion 24 formed in an annular shape and engagement piece portions 25, 25, 25 protruding forwardly from an outer circumferential portion of the base surface portion 24. The engagement piece portions 25, 25, 25 are provided while being set apart from each other in a circumferential direction (see FIGS. 5 and 6).

An inside space of the base surface portion 24 is formed as a circular aperture 24a. On a front surface of the base surface portion 24, an annular support groove 26 is formed on an outer circumferential side of the aperture 24a. The support groove 26 includes an annular base support portion 26a, movement portions 26b, 26b, . . . that are continuous on an outer circumferential side of the base support portion 26a, and a coupling portion 26c that is formed at a position crossing the base support portion 26a in a radial direction. The movement portions 26b, 26b, . . . are formed in an arc shape and positioned while being set apart from each other in a circumferential direction.

An insertion hole 24b penetrating in the front-back direction is formed in the base surface portion 24. The insertion hole 24b is formed in the coupling portion 26c of the support groove 26. A through-hole 24c penetrating in the front-back direction is formed in the base surface portion 24. The through-hole 24c is formed in the base support portion 26a of the support groove 26. The through-hole 24c is formed in an arc shape having a curvature that is the same as a curvature of the base support portion 26a.

On an outer circumferential side of the base support portion 26a on the front surface of the base surface portion 24, support shafts 24d, 24d, . . . that protrude forwardly, first stopper portions 24e, 24e, . . . , and second stopper portions 24f, 24f, . . . are provided while being set apart from each other in the circumferential direction. The first stopper portions 24e, 24e, . . . and the second stopper portions 24f, 24f, . . . are alternately provided at the outer circumferential portion of the base surface portion 24 in the circumferential direction.

On an outer circumferential surface of the base surface portion 24, lock concave grooves 24g, 24g, 24g that are opened in the front-back direction and outwardly are formed while being set apart from each other in the circumferential direction.

On a rear surface side of the base surface portion 24, a case portion 27 is integrally formed (see FIGS. 6 to 9). The case portion 27 has a substantially rectangular frame-shaped portion 28 that protrudes rearwardly from the base surface portion 24, and the inner space thereof is formed as an arrangement space 27a.

On the inner surface side of the frame-shaped portion 28, connection concave portions 28a, 28a are formed while being set apart from each other in the circumferential direction of the base surface portion 24. The connection concave portions 28, 28 are opened rearwardly and in a direction facing each other. On the inner surface side of the frame-shaped portion 28, restriction protrusion portions 29, 29 are formed while being set apart from each other in the circumferential direction of the base surface portion 24. The restriction protrusion portions 29, 29 protrude in a direction facing each other.

In the arrangement space 27a of the case portion 27, a braking body 30 is arranged. The braking body 30 includes bias springs 31, 31 and a control member 32.

The bias springs 31, 31 are, for example, plate springs and arranged in the arrangement space 27a in a state where the bias springs 31, 31 face each other in the radial direction of the base surface portion 24, and both end portions thereof in a longitudinal direction are inserted into the connection concave portions 28a, 28a and thus connected to the case portion 27.

Figure 10:
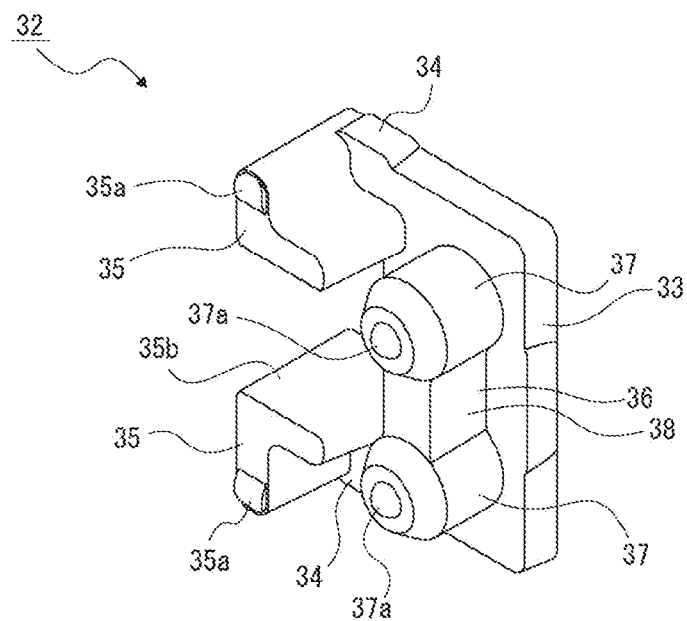
FIG. 10 A perspective view showing a control member.
Figure 11:
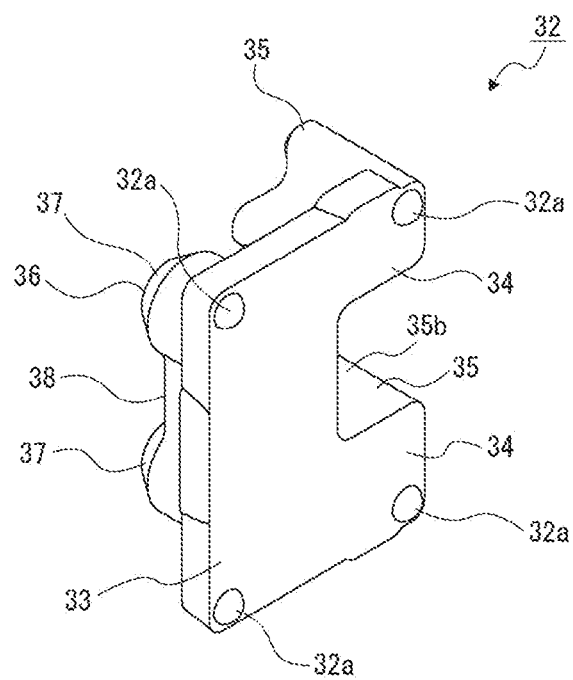
FIG. 11 A perspective view showing the control member viewed from a direction different from that of FIG. 10.

The control member 32 is, for example, a slider and is supported by the base body 21 so as to be movable in the longitudinal direction of the braking bodies 30, 30. As shown in FIGS. 10 and 11, the control member 32 includes a base 33 that is formed in a substantially rectangular plate shape, restricted protrusion portions 34, 34 that protrude from the base 33 to the opposite sides on the aperture 24a side, braking protrusion portions 35, 35 that protrude forwardly from the restricted protrusion portions 34, 34, and an operation protrusion portion 36 that protrudes forwardly from a portion of the front surface of the base 33, the portion excluding the outer circumferential portion.

At the four corners of a rear surface of the control member 32, protrusion portions that protrude rearwardly are provided, and apical surfaces of the protrusion portions are formed as sliding surfaces 32a, 32a, . . . having a rearwardly convex curved shape.

At the braking protrusion portions 35, 35, protrusion portions that protrude forwardly are provided, and apical surfaces of the protrusion portions are formed as sliding surfaces 35a, 35a having a forwardly convex curved shape. Facing surfaces of the braking protrusion portions 35, 35 are formed as operation surfaces 35b, 35b.

Both end portions of the operation protrusion portion 36 in the longitudinal direction of the bias spring 31 are provided as pressed portions 37, 37 each having a cylindrical shaft shape. A portion between the pressed portions 37, 37 in the operation protrusion portion 36 is provided as an intermediate portion 38, and the width of the intermediate portion 38 in a direction in which the bias springs 31, 31 are arranged is smaller than the outer diameter of each of the pressed portions 37, 37. The pressed portions 37, 37 include protrusion portions that protrude forwardly, and apical surfaces of the protrusion portions are formed as sliding surfaces 37a, 37a each having a forwardly convex spherical shape.

Figure 9:
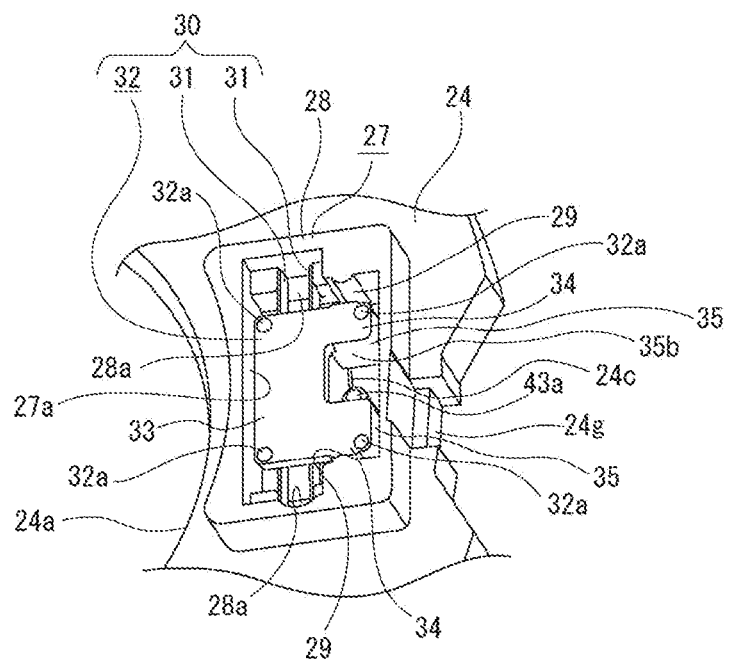
Figure 12:
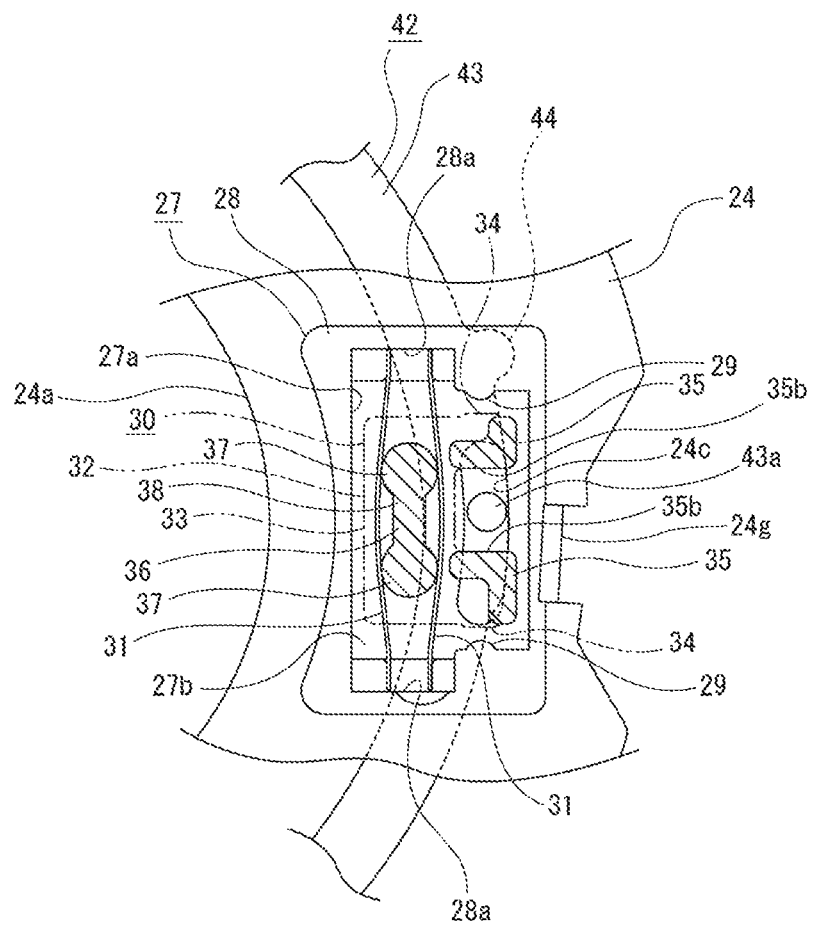
FIG. 12 A schematic rear view showing a state where the control member is supported by the base body via bias springs.

The control member 32 is movably supported by the base body 21 in a state where the operation protrusion portion 36 is inserted between the bias springs 31, 31 from the rear side (see FIGS. 9 and 12). In the state where the control member 32 is supported by the base body 21, the bias springs 31, 31 are bent in a direction in which the bias springs 31, 31 are set apart from each other by the pressed portions 37, 37 of the operation protrusion portion 36, and thus elastically deformed. Therefore, a bias force is applied to the control member 32 from the bias springs 31, 31.

Although the control member 32 is movable in the longitudinal direction of the bias springs 31, 31, since both the end portions of the bias springs 31, 31 in the longitudinal direction are connected to the case portion 27, the bias force to be applied to the control member 32 is the minimum at the center portions of the bias springs 31, 31 in the longitudinal direction and becomes larger with increasing distance from those center portions thereof in the longitudinal direction. Therefore, in the control member 32, a braking force becomes larger relative to the moving force with increasing distance to the both the end portions of the bias springs 31, 31 in the longitudinal direction.

Figure 8:
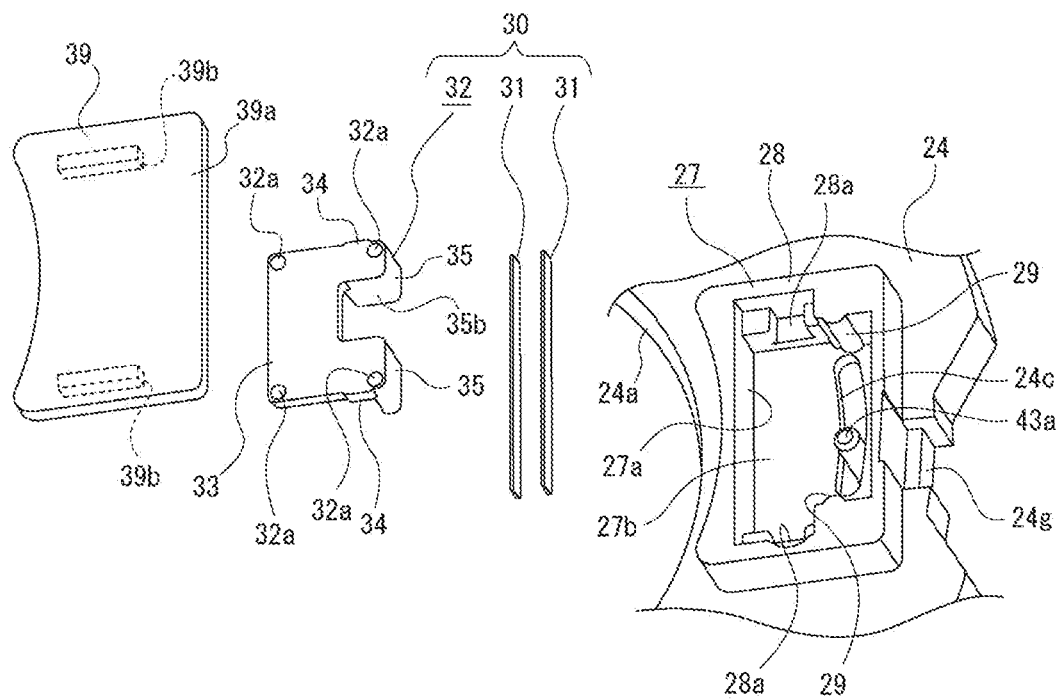
Figure 13:
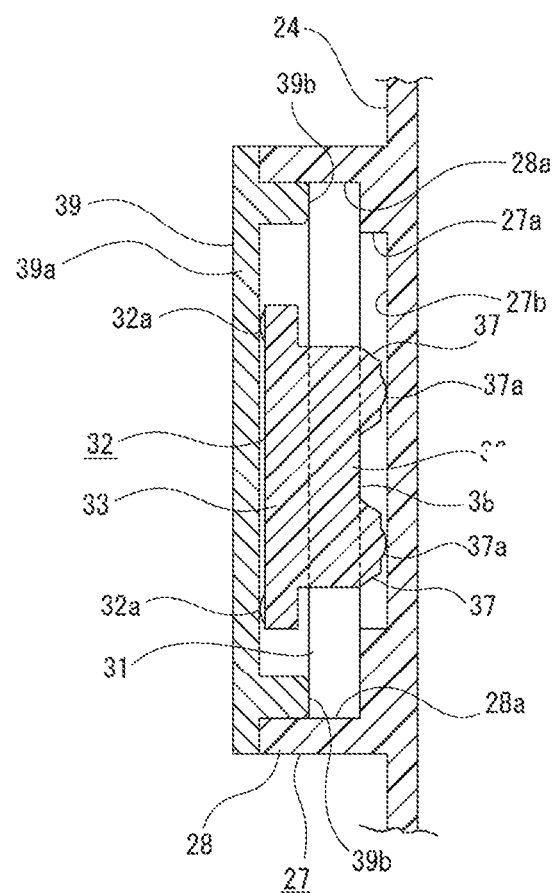
FIG. 13 A cross-sectional view showing a state where a cover is attached to a case portion in which the braking body is arranged.

In the state where the bias springs 31, 31 and the control member 32 are arranged in the arrangement space 27a of the case portion 27, a cover 39 that closes the arrangement space 27a is attached to the case portion 27 (see FIGS. 8 and 13).

The cover 39 includes a closing surface portion 39a having a rectangular flat plate shape, and presser protrusion portions 39b, 39b that protrude forwardly from the closing surface portion 39a. The presser protrusion portions 39b, 39b are provided while being set apart from each other in the longitudinal direction of the bias springs 31, 31.

In a state where the cover 39 is attached to the case portion 27, the bias springs 31, 31 are pressed by the presser protrusion portions 39b, 39b from the rear side, so that the bias springs 31, 31 are prevented from falling off from the case portion 27 (see FIG. 13).

In the control member 32, the sliding surfaces 35a, 35a and the sliding surfaces 37a, 37a come into point contact with a bottom surface 27b of the case portion 27, and the sliding surfaces 32a, 32a, . . . come into point contact with the front surface of the closing surface portion 39a of the cover 39. Therefore, the control member 32 is pressed by the case portion 27 and the cover 39 from the upper and lower direction, so that rattling in the upper and lower direction of the control member 32 is prevented from occurring. Further, since the control member 32 is moved in the longitudinal direction of the bias springs 31, 31 with the sliding surfaces 35a, 35a, 37a, 37a, 32a, 32a, . . . being brought into point contact with the case portion 27 and the cover 39, a smoothly moving state can be secured without rattling.

The through-hole 24c formed in the base surface portion 24 is opened in the bottom surface 27b of the case portion 27.

A driving motor 40 is attached to the rear surface of the base surface portion 24 in the base body 21 (see FIGS. 4 to 7). The driving motor 40 functions as a drive source, in which an arm member 41 is fixed to an output shaft 40a. One end portion of the arm member 41 is fixed to the output shaft 40a. The other end portion of the arm member 41 is provided with a coupling pin 41a that protrudes forwardly. The arm member 41 is positioned in the insertion hole 24b formed in the base surface portion 24.

Figure 6:
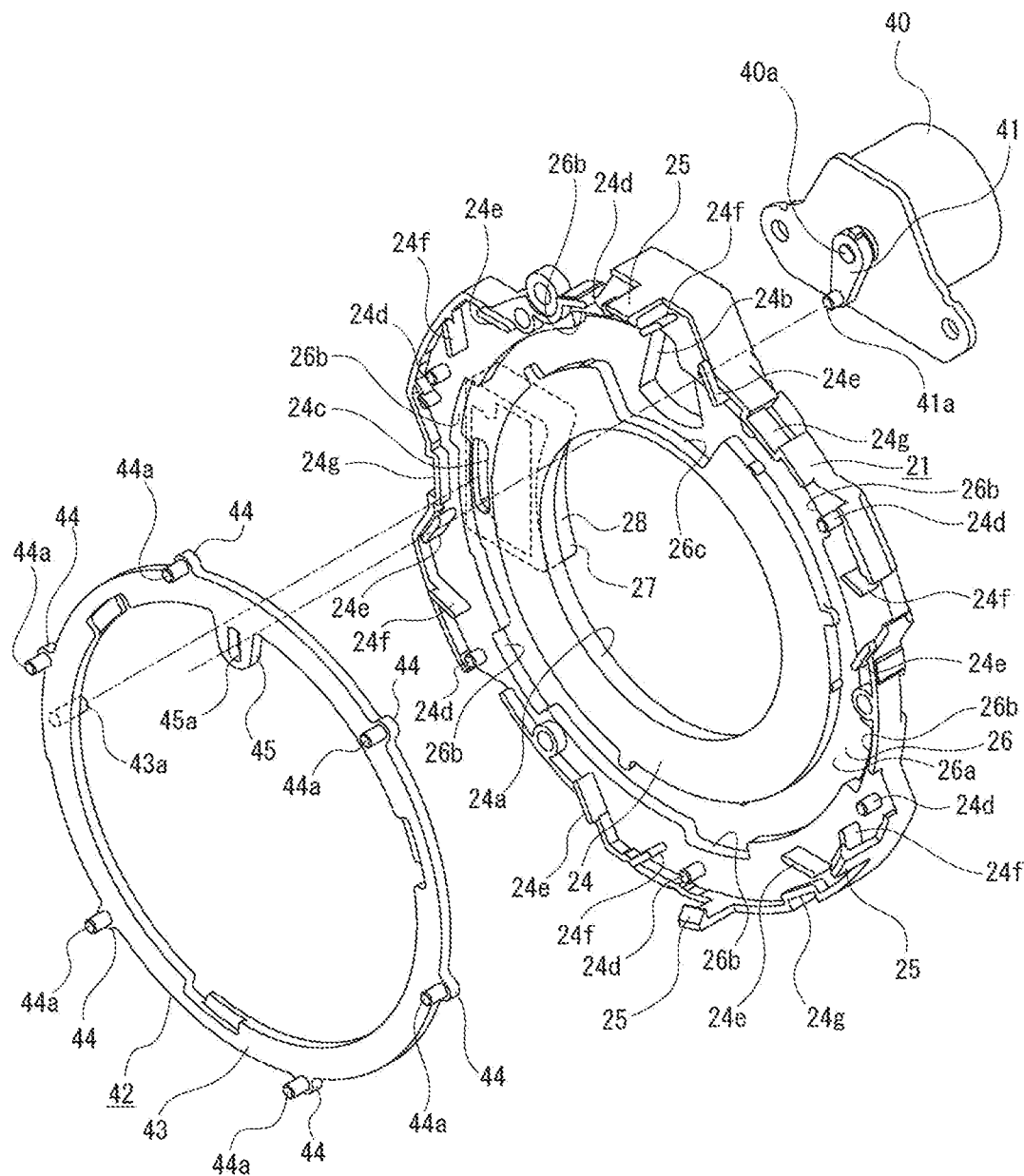
FIG. 6 An exploded perspective view showing a driving body, a base body, and a driving motor.
Figure 7:
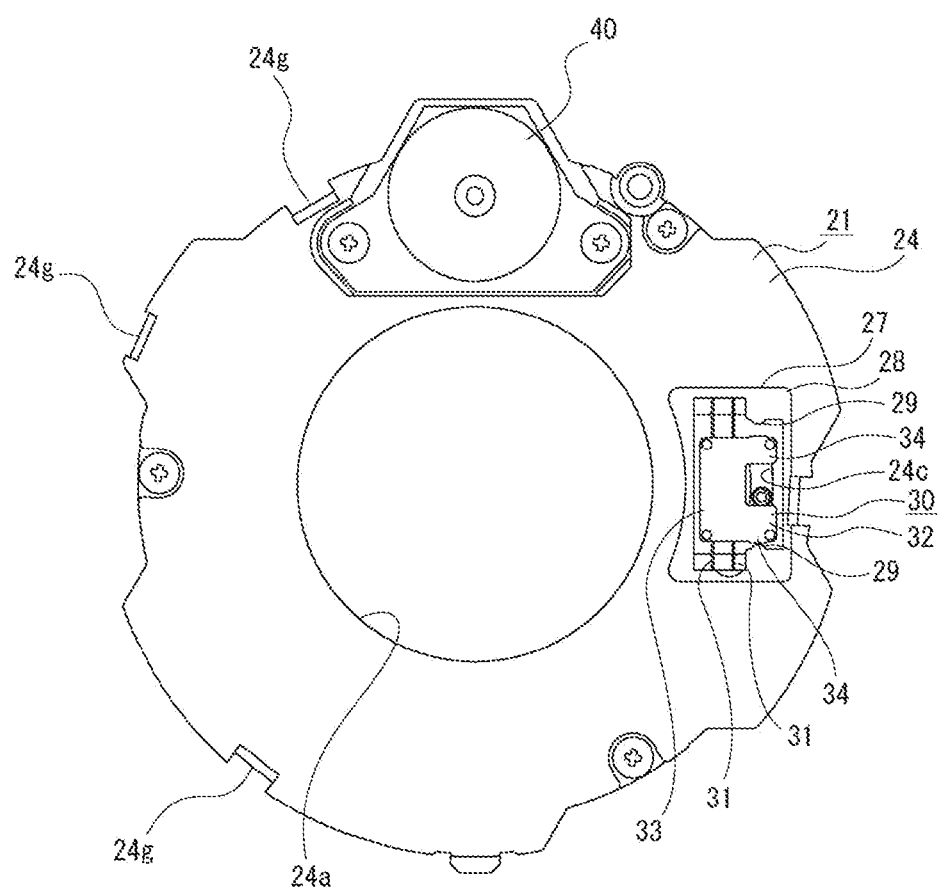
FIG. 7 A rear view of the blade opening/closing apparatus.
Figure 14:
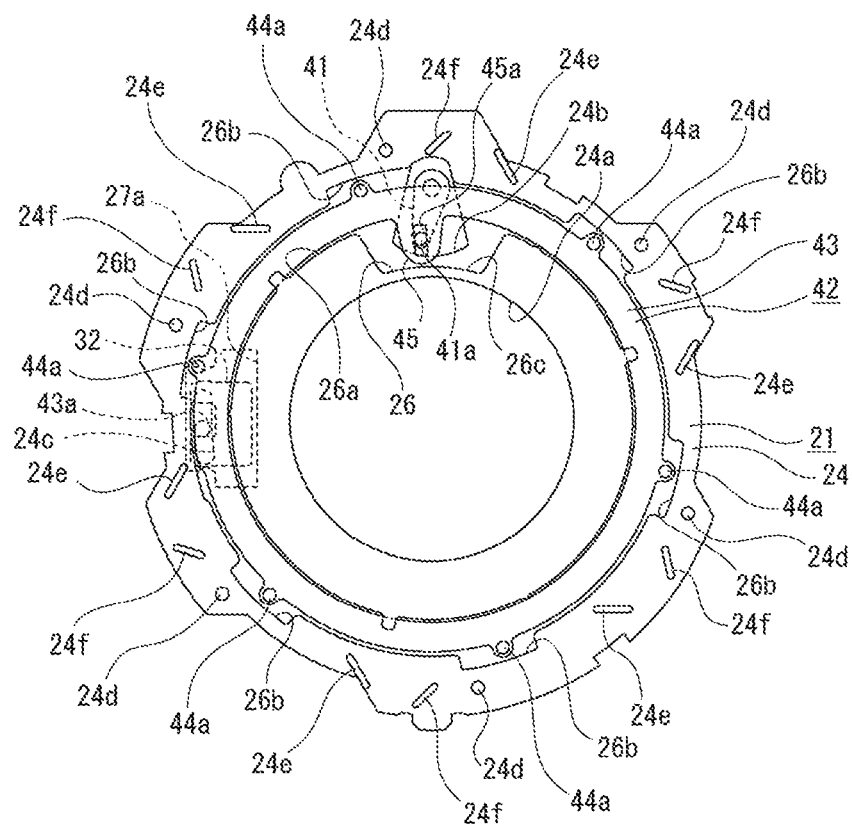
FIG. 14 A front view showing a state where the driving body is supported by the base body.
Figure 15:
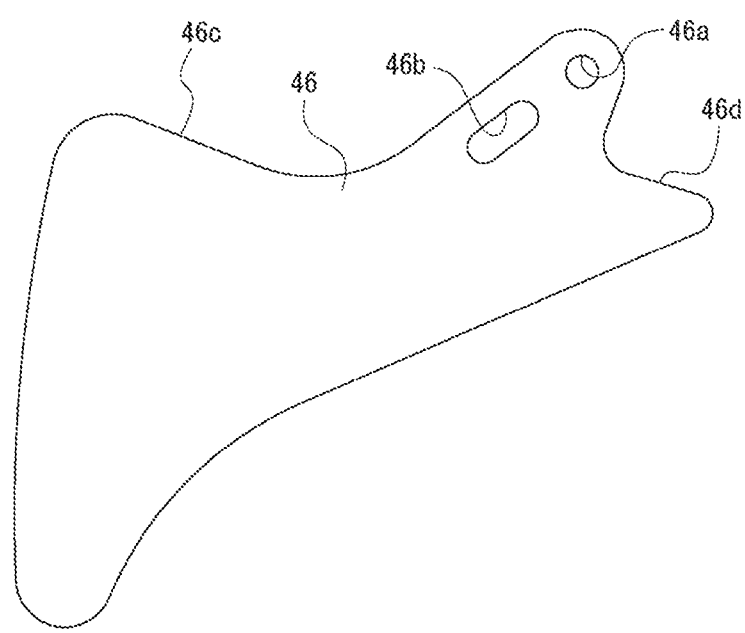
FIG. 15 A front view showing an opening/closing blade.

A driving body 42 formed in an annular shape is rotatably supported by the base surface portion 24 of the base body 21 while being inserted in the support groove 26 (see FIGS. 6 and 14). The driving body 42 is prevented from falling off from the base surface portion 24 by a bayonet structure. The driving body 42 includes a supported portion 43 formed in a ring shape, pin forming portions 44, 44, . . . that protrude outwardly from the supported portion 43, and a protruding portion 45 that protrudes inwardly from the supported portion 43.

As described above, the driving body 42 is formed in an annular shape and is rotatably supported by the base body 21 on the outer circumferential side of the aperture 24a.

Therefore, since the annular driving body 42 is positioned on the outer circumferential side of the aperture 24a and is rotated there, a space that is larger than the arrangement space of the driving body 42 in the base body 21 does not need to be formed as a moving space of the driving body 42, and miniaturization of the blade opening/closing apparatus 11 can be achieved by effectively using the spaces.

A braked pin 43a that protrudes rearwardly is integrally provided to the supported portion 43. The braked pin 43a is provided as a braked portion to which the braking force of the braking body 30 is to be applied. The braked pin 43a is inserted into the through-hole 24c formed in the base surface portion 24, and a tip end portion thereof is positioned between the braking protrusion portions 35, 35 of the control member 32 in the arrangement space 27a of the case portion 27 (see FIG. 12).

Cam pins 44a, 44a, . . . that protrude forwardly are integrally provided to the pin forming portions 44, 44, . . . (see FIGS. 6 and 14). The cam pins 44a, 44a, . . . are provided as engagement portions that are to be engaged with opening/closing blades, which will be described later, and transmit a driving force to the opening/closing blades.

A coupling hole 45a having a long hole shape is formed in the protruding portion 45, and the coupling pin 41a of the arm member 41 that is positioned in the insertion hole 24b is inserted into the coupling hole 45a in a slidable state. Therefore, the driving body 42 is coupled to the arm member 41 by the coupling hole 45a and the coupling pin 41a.

The second sheet 20 is arranged on the front surface of the base surface portion 24 of the base body 21 in a state where the driving body 42 is supported (see FIG. 5). In a state where the second sheet 20 is arranged, the support shafts 24d, 24d, . . . of the base body 21 protrude from the shaft insertion portions 20a, 20a, . . . to the front side, and the cam pins 44a, 44a, . . . of the driving body 42 protrude from the pin insertion portions 20b, 20b, . . . to the front side. Further, the first stopper portions 24e, 24e, . . . and the second stopper portions 24f, 24f, . . . of the base body 21 protrude from the outer side of the second sheet 20 to the front side.

In the state where the second sheet 20 is arranged on the base surface portion 24, opening/closing blades 46, 46, 46 are arranged on the front surface of the second sheet 20. The opening/closing blade 46 includes, at one end portion, a supported hole 46a having a circular shape and a cam hole 46b having a long hole shape (see FIG. 15). The opening/closing blade 46 includes an outwardly concave, substantially triangular shape, and a side edge of the triangular shaped portion on the cam hole 46b side is formed as a first restriction edge 46c. One end portion of the opening/closing blade 46 is bifurcated, and one side edge of this V-shaped portion is formed as a second restriction edge 46d.

Figure 16:
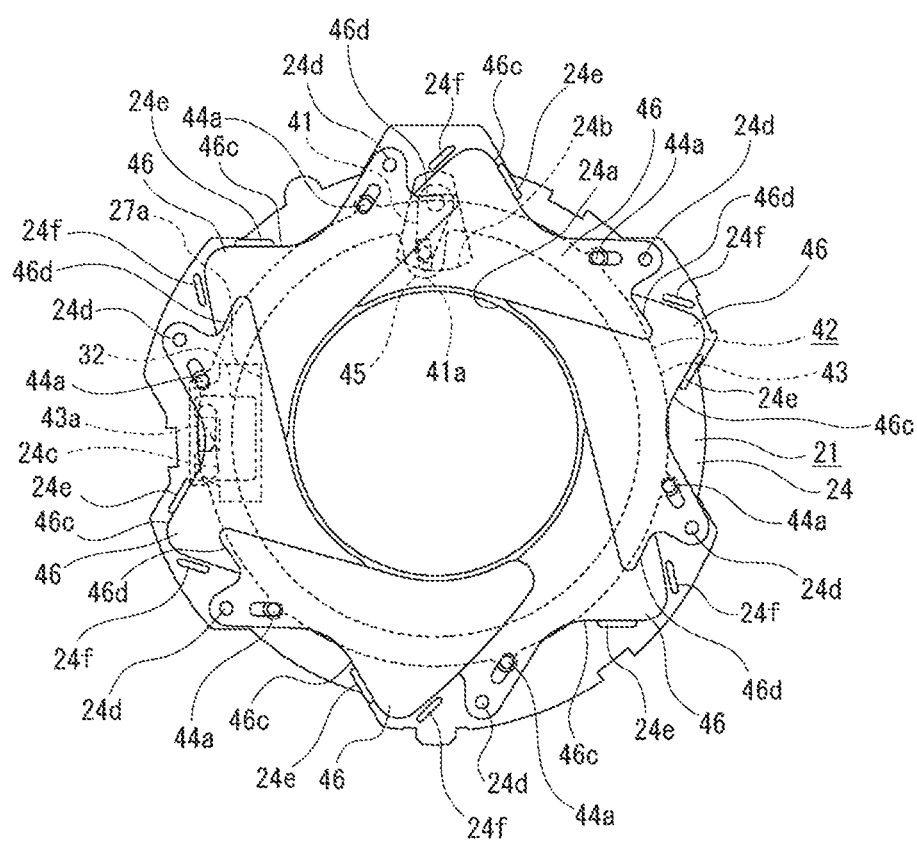
FIG. 16 A schematic front view showing a state where the opening/closing blades are held at an opening position.
Figure 17:
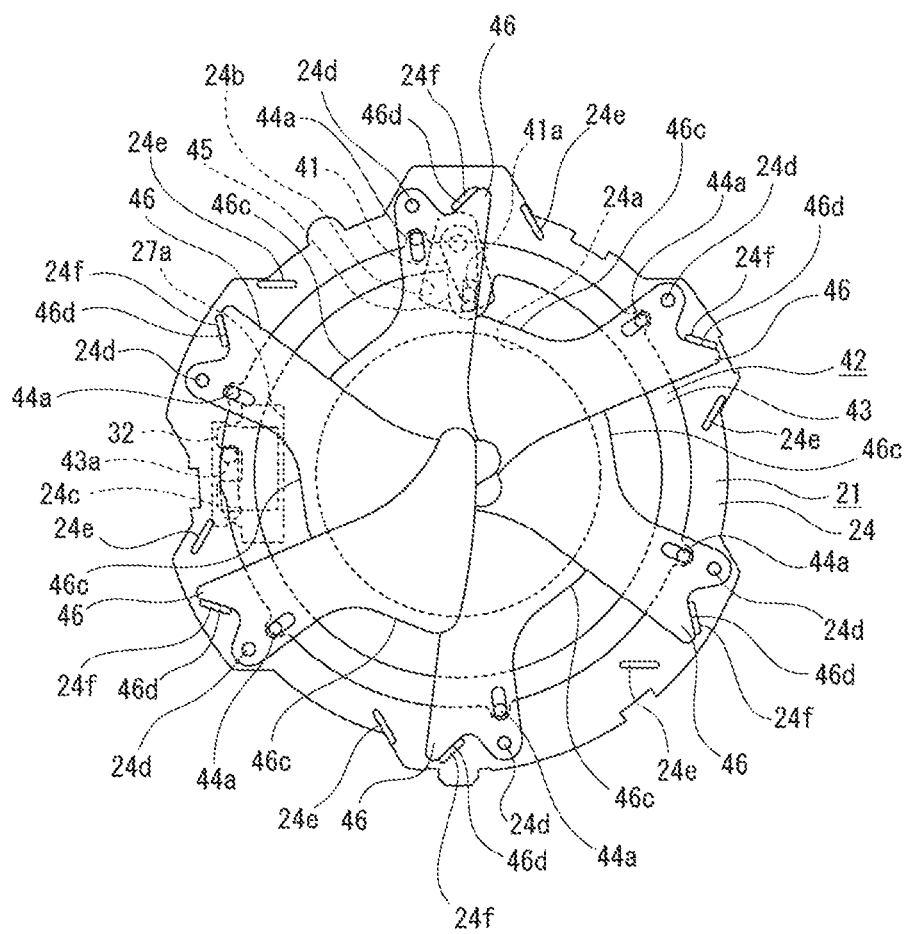
FIG. 17 A schematic front view showing a state where the opening/closing blades are held at a closing position.

The opening/closing blades 46, 46, 46 are arranged while partially overlapping one another in a thickness direction (front-back direction) (see FIGS. 16 and 17).

The opening/closing blade 46 is rotated between an opening position (see FIG. 16) where a movement of the first restriction edge 46c is restricted by the first stopper portion 24e of the base body 21 and a closing position (see FIG. 17) where a movement of the second restriction edge 46d is restricted by the second stopper portion 24f of the base body 21.

The support shaft 24d of the base body 21 is inserted into the supported hole 46a, the cam pin 44a of the driving body 42 is inserted into the cam hole 46b, and the position of the cam hole 46b is relatively changed with respect to the cam pin 44a with the rotation of the driving body 42, so that the opening/closing blade 46 is rotated using the support shaft 24d as a fulcrum.

In the state where the opening/closing blades 46, 46, 46 are arranged on the front surface of the second sheet 20, the first sheet 19 is arranged on the front surface side of the opening/closing blades 46, 46, 46, and opening/closing blades 46, 46, 46 are arranged also on the front surface of the first sheet 19 (see FIG. 5).

In the state where the second sheet 20 is arranged on the front surface side of the opening/closing blades 46, 46, 46, the support shafts 24d, 24d, . . . of the base body 21 protrude from the insertion portions 19a, 19a, . . . to the front side, and the cam pins 44a, 44a, . . . of the driving body 42 protrude from the pin insertion portions 19b, 19b, . . . to the front side. Further, the first stopper portions 24e, 24e, . . . and the second stopper portions 24f, 24f, . . . of the base body 21 protrude from the outer side of the first sheet 19 to the front side.

The opening/closing blades 46, 46, 46 arranged on the front surface of the first sheet 19 are also arranged while partially overlapping one another in the thickness direction (front-back direction) (see FIGS. 16 and 17). The opening/closing blades 46, 46, 46 arranged on the front surface of the first sheet 19 are arranged at symmetrical positions with respect to the opening/closing blades 46, 46, 46 arranged on the front surface of the second sheet 20 with the center of the aperture 24a of the base surface portion 24 being used as a reference.

As in the case of the opening/closing blade 46 arranged on the front surface of the second sheet 20, in the opening/closing blade 46 arranged on the front surface of the first sheet 19, the support shaft 24d is inserted into the supported hole 46a, the cam pin 44a is inserted into the cam hole 46b, so that the opening/closing blade 46 is rotated between the opening position and the closing position with the rotation of the driving body 42.

The presser plate 18 is arranged on the front surface side of the opening/closing blades 46, 46, 46 arranged on the front surface of the first sheet 19, and the opening/closing blades 46, 46, 46 are pressed by the presser plate 18 from the front side (see FIG. 5).

The presser plate 18 and the base body 21 are connected to each other when the lock piece portions 23, 23, 23 are locked to the lock concave grooves 24g, 24g, 24g and the engagement piece portions 25, 25, 25 are engaged with the engagement concave grooves 22a, 22a, 22a (see FIG. 4). The presser plate 18 and the base body 21 are connected to each other, and thus the first sheet 19 and the second sheet 20 are held between the presser plate 18 and the base body 21, and the opening/closing blades 46, 46, . . . are held therebetween in a rotatable state.

As described above, in the state where the presser plate 18 and the base body 21 are connected to each other and the blade opening/closing apparatus 11 is thus configured, the optical unit 13 and the blade opening/closing apparatus 11 are connected to each other in the front-back direction by fastening screws or the like.

<Operation of Blade Opening/Closing Apparatus>

Hereinafter, an operation of the opening/closing blades 46, 46, . . . in the blade opening/closing apparatus 11 and an operation of the braking body 30 that is associated with the above operation will be described (see FIGS. 16 to 21).

First, states of respective portions when the opening/closing blades 46, 46, . . . are at the opening position will be described (see FIGS. 16 and 18).

At the opening position, the driving body 42 is positioned at one rotation end, and the whole of each of the opening/closing blades 46, 46, . . . is positioned outside the aperture 24a of the base surface portion 24, and the whole of the aperture 24a is opened (see FIG. 16). At that time, in the opening/closing blade 46, the first restriction edge 46c is in contact with the first stopper portion 24e of the base body 21, and a rotation in a direction opposite to the closing position is restricted.

Figure 18:
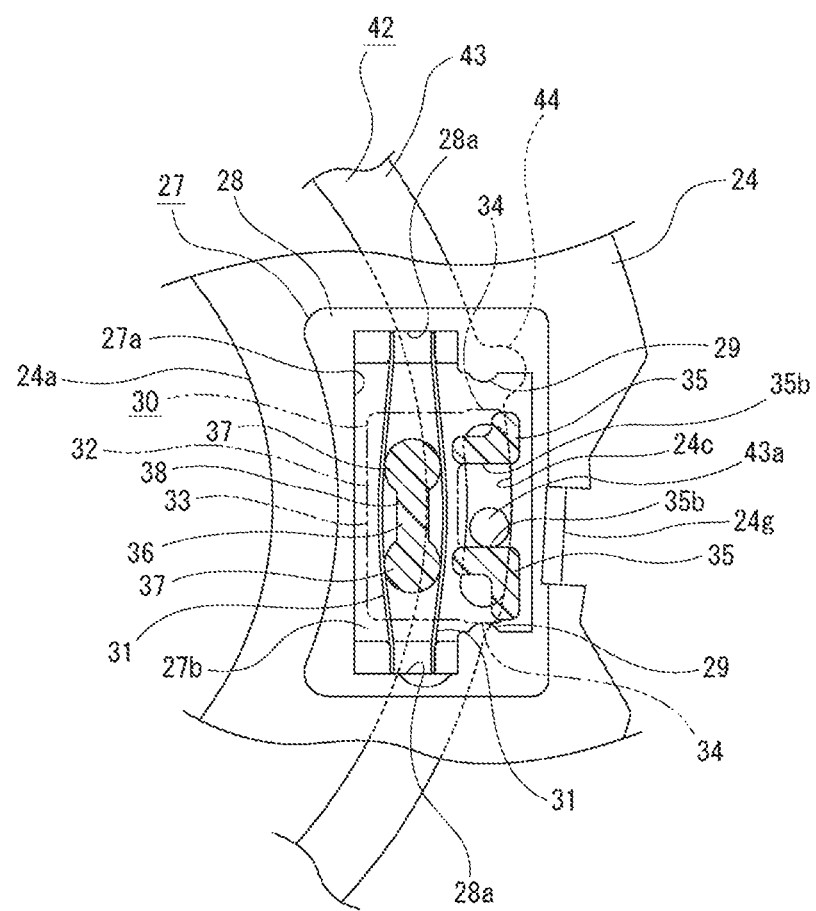
FIG. 18 A schematic rear view showing a state of the control member and the like when the opening/closing blades are at the opening position.
Figure 19:
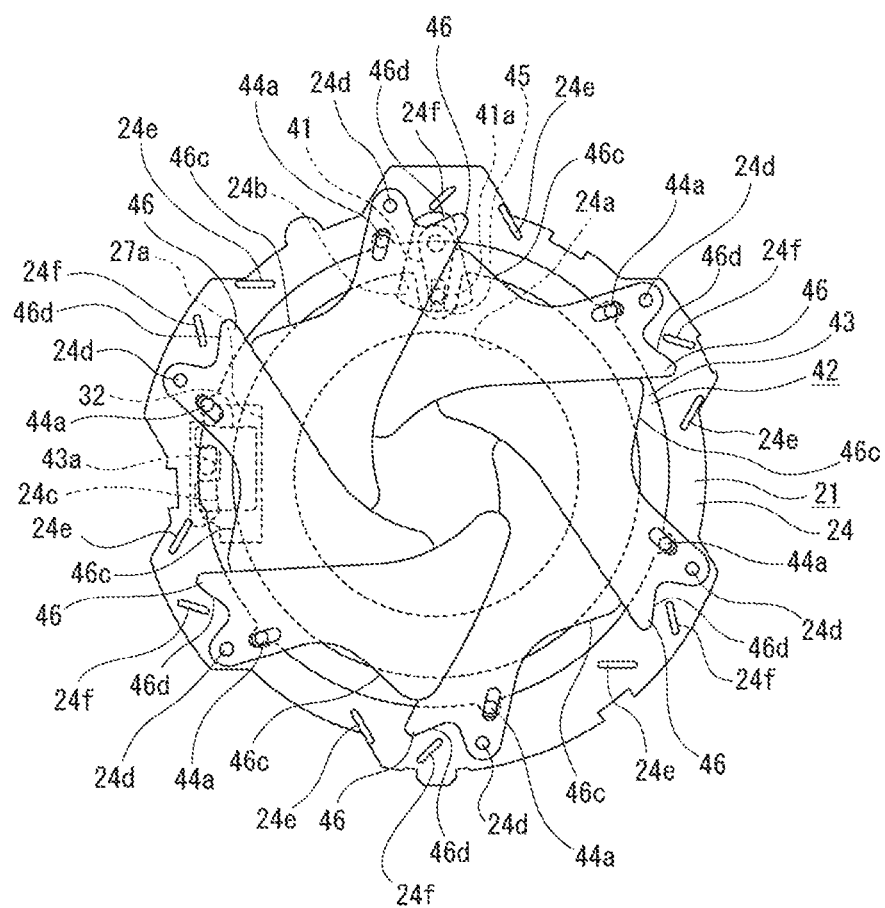
FIG. 19 A schematic front view showing a state where the opening/closing blades are being rotated between the opening position and the closing position.
Figure 20:
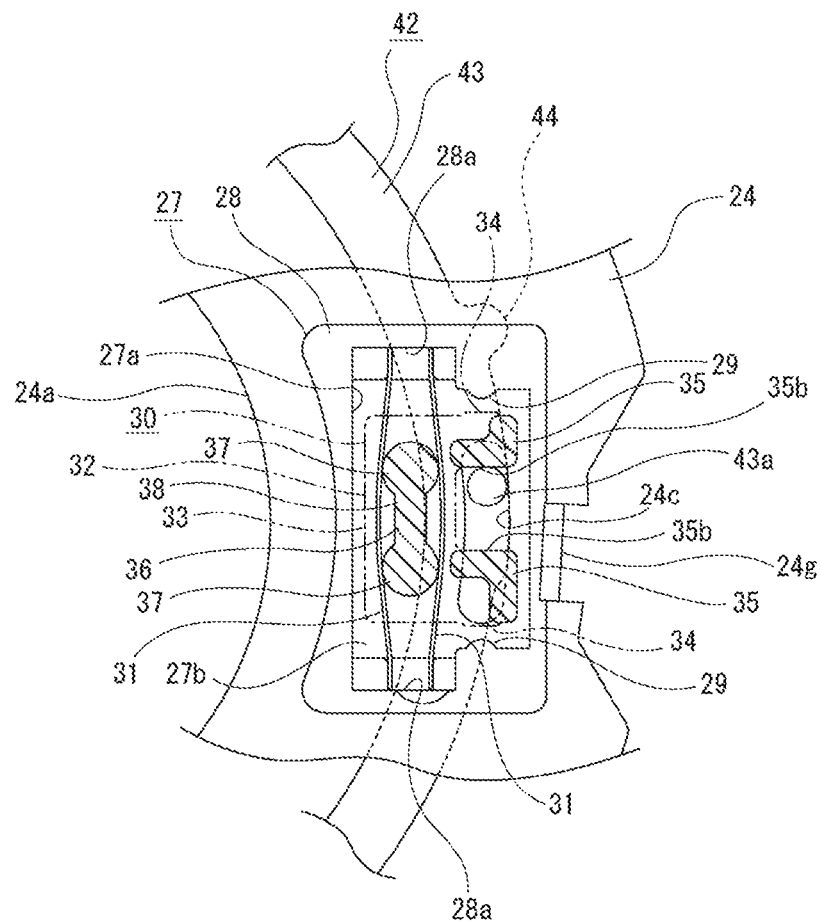
FIG. 20 A schematic rear view showing a state of the control member and the like when the opening/closing blades are between the opening position and the closing position.

In the state where the opening/closing blade 46 is at the opening position, the braked pin 43a of the driving body 42 is pressed against one operation surface 35b of the control member 32 (see FIG. 18). Since the braked pin 43a is pressed against the one operation surface 35b, one restricted protrusion portion 34 of the control member 32 is in contact with one restriction protrusion portion 29 of the case portion 27. The movement of the control member 32 is restricted, and the control member 32 is held at one movement end.

When the rotation of the arm member 41 is started by the drive of the driving motor 40, the driving body 42 engaged with the coupling pin 41a is rotated with respect to the base body 21. By the rotation of the driving body 42, the cam pins 44a, 44a, . . . are moved in the circumferential direction, the positions of the cam hole 46b, 46b, . . . of the opening/closing blades 46, 46, . . . are relatively changed with respect to the cam pins 44a, 44a, . . . , and the opening/closing blades 46, 46, . . . are rotated from the opening position toward the closing position (see FIG. 19).

When the opening/closing blades 46, 46, . . . are rotated from the opening position toward the closing position, the braked pin 43a of the driving body 42 is also moved in the circumferential direction. Thus, the braked pin 43a separates from the one operation surface 35b and then comes into contact with the other operation surface 35b, and the control member 32 is pressed by the braked pin 43a and is caused to move (slide) (see FIG. 20). At that time, the control member 32 is moved in a direction tangent to the rotation direction of the driving body 42.

The driving body 42 is continuously rotated with respect to the base body 21, and the opening/closing blades 46, 46, . . . are rotated to the closing position (see FIG. 17). The second restriction edge 46d comes into contact with the second stopper portion 24f of the base body 21, a rotation in a direction opposite to the opening position is restricted, and the opening/closing blade 46 is held at the closing position.

Figure 21:
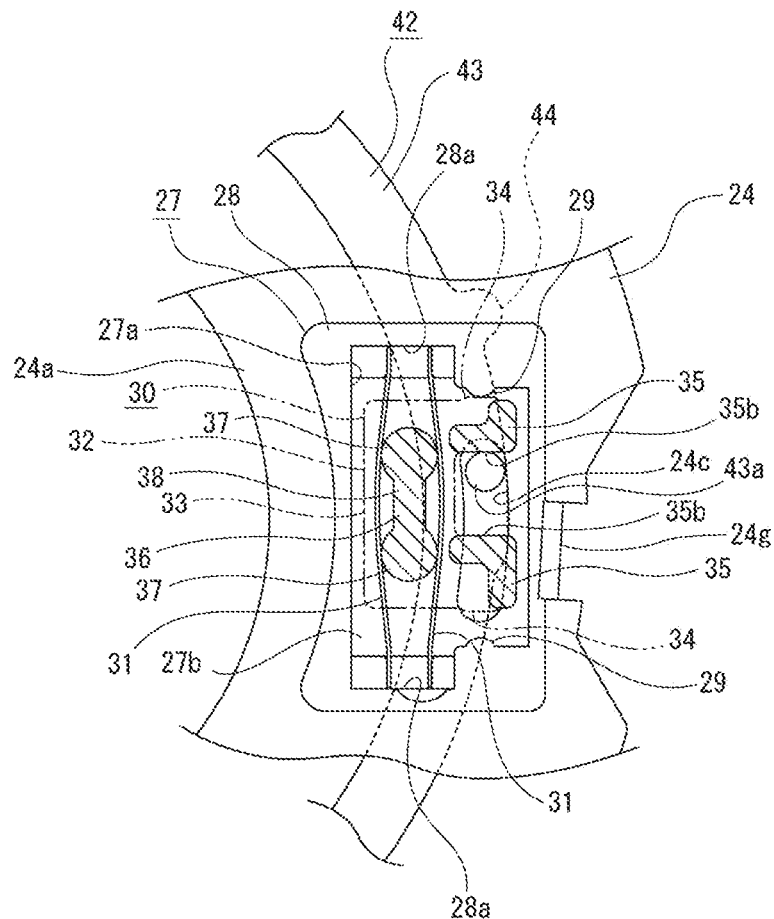
FIG. 21 A schematic rear view showing a state of the control member and the like when the opening/closing blades are at the closing position.

When the driving body 42 is continuously rotated with respect to the base body 21, and the opening/closing blades 46, 46, . . . are rotated to the closing position, the other operation surface 35b is pressed by the braked pin 43a, and thus the control member 32 is further moved (see FIG. 21). At that time, the operation protrusion portion 36 of the control member 32 that is inserted between the bias springs 31, 31 is moved in a direction approaching one end portions of the bias springs 31, 31 in the longitudinal direction, and thus the bias force from the bias springs 31, 31 to the control member 32 is gradually increased.

Since the bias force from the bias springs 31, 31 to the control member 32 is gradually increased, a braking force that increases with the movement is to be applied to the control member 32. The braking force is transmitted from the control member 32 to the opening/closing blades 46, 46, . . . via the driving body 42, and a rotary speed of the opening/closing blades 46, 46, . . . is lowered with increasing distance to the closing position.

In such a manner, since the rotary speed of the opening/closing blades 46, 46, . . . is lowered with increasing distance to the closing position, bounds of the opening/closing blades 46, 46, . . . at the closing position are suppressed.

The other restricted protrusion portion 34 of the control member 32 is in contact with the other restriction protrusion portion 29 of the case portion 27, the movement of the control member 32 is restricted, and the control member 32 is held at the other movement end.

Conversely, at the closing position, when the rotation of the arm member 41 in the opposite direction is started by the drive of the driving motor 40, the driving body 42 is rotated with respect to the base body 21 in a direction opposite to the above-mentioned direction. By the rotation of the driving body 42, the cam pins 44a, 44a, . . . are moved in the circumferential direction, the positions of the cam hole 46b, 46b, . . . of the opening/closing blades 46, 46, . . . are relatively changed with respect to the cam pins 44a, 44a, . . . , and the opening/closing blades 46, 46, . . . are rotated from the closing position toward the opening position.

When the opening/closing blades 46, 46, . . . are rotated from the closing position toward the opening position, the braked pin 43a of the driving body 42 is also moved in the circumferential direction. Thus, the braked pin 43a separates from the other operation surface 35b and then comes into contact with the one operation surface 35b, and the control member 32 is pressed by the braked pin 43a and is caused to move (slide). At that time, the control member 32 is moved in a direction tangent to the rotation direction of the driving body 42.

The driving body 42 is continuously rotated in the opposite direction with respect to the base body 21, and the opening/closing blades 46, 46, . . . are rotated to the opening position (see FIG. 16). The first restriction edge 46c comes into contact with the first stopper portion 24e of the base body 21, a rotation in a direction opposite to the closing position is restricted, and the opening/closing blade 46 is held at the opening position (see FIG. 18).

When the driving body 42 is continuously rotated with respect to the base body 21, and the opening/closing blades 46, 46, . . . are rotated to the opening position, the one operation surface 35b is pressed by the braked pin 43a, and the operation protrusion portion 36 is moved in a direction approaching the other end portions of the bias springs 31, 31 in the longitudinal direction, and thus the bias force from the bias springs 31, 31 to the control member 32 is gradually increased.

Since the bias force from the bias springs 31, 31 to the control member 32 is gradually increased, a braking force that increases with the movement is to be applied to the control member 32. The braking force is transmitted from the control member 32 to the opening/closing blades 46, 46, . . . via the driving body 42, and a rotary speed of the opening/closing blades 46, 46, . . . is lowered with increasing distance to the opening position.

In such a manner, since the rotary speed of the opening/closing blades 46, 46, . . . is lowered with increasing distance to the opening position, the bounds of the opening/closing blades 46, 46, . . . at the opening position are suppressed.

The one restricted protrusion portion 34 of the control member 32 is in contact with the one restriction protrusion portion 29 of the case portion 27, the movement of the control member 32 is restricted, and the control member 32 is held at the one movement end.

As described above, in the blade opening/closing apparatus 11, at least a part of each of the plurality of opening/closing blades 46, 46, . . . is movably (rotatably) supported by the base body 21 on the outer circumferential side of the aperture 24a, and the opening/closing blades 46, 46, . . . are moved in a direction in which the opening/closing blades 46, 46, . . . are set apart from the center of the aperture 24a, so that the aperture 24a is to be opened and closed.

Therefore, since at least a part of each of the plurality of opening/closing blades 46, 46, . . . positioned on the outer circumferential side of the aperture 24a is moved, the amounts of movement of the opening/closing blades 46, 46, . . . are made small, and the miniaturization of the blade opening/closing apparatus 11 can be achieved.

Further, when the opening/closing blades 46, 46, . . . are rotated from the opening position to the closing position, the opening/closing blades 46, 46, . . . simultaneously come into contact with the second stopper portions 24f, 24f, . . . and the movements thereof are restricted, and when the opening/closing blades 46, 46, . . . are rotated from the closing position to the opening position, the opening/closing blades 46, 46, . . . simultaneously come into contact with the first stopper portions 24e, 24e, . . . and the movements thereof are restricted.

Therefore, since the plurality of opening/closing blades 46, 46, . . . simultaneously come into contact with the first stopper portions 24e, 24e, . . . or the second stopper portions 24f, 24f, . . . and then stop, loads to be applied to the opening/closing blades 46, 46, . . . from the first stopper portions 24e, 24e, . . . or the second stopper portions 24f, 24f, . . . at the time of stop are dispersed to the plurality of opening/closing blades 46, 46, . . . , so that the opening/closing blades 46, 46, . . . can be prevented from being damaged or scratched.

Furthermore, the blade opening/closing apparatus 11 includes the first stopper portions 24e, 24e, . . . that stop the opening/closing blades 46, 46, . . . at the opening position and the second stopper portions 24f, 24f, . . . that stop the opening/closing blades 46, 46, . . . at the closing position, and the first stopper portions 24e, 24e, . . . and the second stopper portions 24f, 24f, . . . are alternately provided at the outer circumferential portion of the base body 21 in the circumferential direction thereof.

Therefore, since all of the stopper portions are positioned at the outer circumferential portion of the base body 21, it is possible to secure smooth operations of the opening/closing blades 46, 46, . . . while simplifying the structure.

Furthermore, the braking body 30 includes the control member 32 movably supported by the base body 21 and the bias springs 31, 31 that bias the control member 32, and when the braked pin 43a comes into contact with the control member 32, the bias force of the bias springs 31, 31, as a braking force, is applied to the braked pin 43a via the control member 32.

Therefore, since the braking force is applied to the braked pin 43a brought into contact with the control member 32 from the bias springs 31, 31 via the control member 32, and the braking force is transmitted to the opening/closing blades 46, 46, . . . from the driving body 42, the movement speeds of the opening/closing blades 46, 46, . . . can be reliably controlled by the simple structure.

Further, since the control member 32 is slidably supported by the base body 21 and is caused to slide such that the braking force is applied to the opening/closing blades 46, 46, . . . via the driving body 42, the operation of the control member 32 is a simple operation, and the movement speeds of the opening/closing blades 46, 46, . . . can be reliably controlled while securing simplification of the structure.

Furthermore, the driving body 42 is rotatably supported by the base body 21, and a sliding direction of the control member 32 is set to a direction tangent to the rotation direction of the driving body 42.

Therefore, since the control member 32 is caused to slide in the tangent direction and the braking force is applied to the opening/closing blades 46, 46, . . . via the driving body 42, the operation of the control member 32 is a simple operation, an operating space of the control member 32 is made small, and the movement speeds of the opening/closing blades 46, 46, . . . can be reliably controlled while securing simplification and miniaturization of the structure.

Furthermore, since the bias force applied to the braked pin 43a from the bias springs 31, 31 is increased as the control member 32 approaches both the ends of the bias springs 31, 31 in the movement direction, the braking force increases as the amounts of movement of the opening/closing blades 46, 46, . . . increase, so that the opening/closing blades 46, 46, . . . can be reliably stopped at the closing position or the opening position, and position accuracy can be improved.

In addition, the plate springs are used as the bias springs 31, 31, the pressed portions 37, 37 to be pressed against the bias springs 31, 31 from the opposite sides are provided to the control member 32, and the bias force in the direction in which the bias springs 31, 31 approach each other is applied to the control member 32.

Therefore, the bias force applied to the control member 32 from the bias springs 31, 31 increases as the control member 32 approaches both the ends of the bias springs 31, 31 in the movement direction, and the braking force can be increased as the amounts of movement of the opening/closing blades 46, 46, . . . increase, so that the opening/closing blades 46, 46, . . . can be reliably stopped, and the position accuracy can be improved.

Further, since the pressed portions 37, 37 are configured to be sandwiched between the paired bias springs 31, 31 as the plate springs, for example, as compared with a case of a single plate spring, the bias force to be applied to the braked pin 43a doubles, and thus the bias force to be applied to the braked pin 43a can be increased without increasing an arrangement space of the plate springs.

CONCLUSION

As described above, the blade opening/closing apparatus 11 includes the engagement portions (cam pins 44a) on one surface of the driving body 42, the engagement portions (cam pins 44a) being to be engaged with the opening/closing blades 46, 46, . . . to transmit the driving force to the opening/closing blades 46, 46, . . . , and the braked portion (braked pin 43a) to which the braking force of the braking body 30 is to be applied, on the other surface of the driving body 42.

Therefore, since the engagement portions that transmit the driving force to the opening/closing blades 46, 46, . . . are provided to the one surface of the driving body 42, and the braked portion to which the braking force of the braking body 30 is to be applied is provided to the other surface of the driving body 42, simplification of the structure is achieved by effectively using spaces in the inner space of the blade opening/closing apparatus 11, and miniaturization due to the simplified structure can be achieved while suppressing the bounds of the opening/closing blades 46, 46, . . . and securing improvement in functionality.

Further, since the bounds of the opening/closing blades 46, 46, . . . are suppressed, it is unnecessary to increase the size of the opening/closing blades 46, 46, . . . to a size corresponding to the amount of overlap in which the bounds are assumed in advance, and the size of the opening/closing blades 46, 46, . . . can be reduced that much. Thus, miniaturization of the blade opening/closing apparatus 11 can be achieved.

Furthermore, since the rotary speed is lowered when the opening/closing blade 46 is moved to the opening position or the closing position, an impact applied from the first stopper portion 24e, the second stopper portion 24f, and the cam pin 44a to the opening/closing blade 46 becomes small. Thus, it is possible to reduce damages of the opening/closing blade 46 and achieve improvement in durability.

Furthermore, since the aperture 24a is opened/closed by the plurality of opening/closing blades 46, 46, . . . , the opening/closing blades 46, 46, . . . are small and light in weight. Thus, it is possible to achieve improvement in operation speed (shutter speed) of the opening/closing blades 46, 46, . . . and also achieve improvement in rigidity.

Further, the opening/closing blades 46, 46, . . . are moved between the opening position at which the aperture 24a is opened and the closing position at which the aperture 24a is closed. During the movement, the braked pin 43a is set apart from the operation surfaces 35b, 35b, and the braking force is not applied to the opening/closing blades 46, 46, . . . . The braking force is applied from the braking body 30 to the opening/closing blades 46, 46, . . . via the braked pin 43a at a part of a zone between the opening position and the closing position.

Therefore, since a non-braked zone in which the braking force is not applied to the opening/closing blades 46, 46, . . . exists in the zone between the opening position and the closing position, the movement speeds of the opening/closing blades 46, 46, . . . are not lowered in the non-braked zone. Thus, the movement speeds of the opening/closing blades 46, 46, . . . can be lowered as needed while securing acceleration of the movement speeds of the opening/closing blades 46, 46, . . . .

Furthermore, the braking force is applied to the braked pin 43a from the braking body 30 at an end portion of the zone on the closing position side.

Therefore, since the braking force is applied to the braked pin 43a from the braking body 30 and the movement speeds of the opening/closing blades 46, 46, . . . are lowered as the opening/closing blades 46, 46, . . . approach the closing position, the opening/closing blades 46, 46, . . . are moved to the closing position at low speed, and after being moved to the closing position, the opening/closing blades 46, 46, . . . are less easily moved toward the opening position by a reaction (bound). Thus, the opening/closing blades 46, 46, . . . can be stably held at the closing position.

Furthermore, the braking force is applied to the braked pin 43a from the braking body 30 at an end portion of the zone on the opening position side.

Therefore, since the braking force is applied to the braked pin 43a from the braking body 30 and the movement speeds of the opening/closing blades 46, 46, . . . are lowered as the opening/closing blades 46, 46, . . . approach the opening position, the opening/closing blades 46, 46, . . . are moved to the opening position at low speed, and after being moved to the opening position, the opening/closing blades 46, 46, . . . are less easily moved toward the closing position by a reaction. Thus, the opening/closing blades 46, 46, . . . can be stably held at the opening position.

Further, since the cam pin 44a is provided as the engagement portion, and the braked pin 43a that protrudes in the direction opposite to the cam pin 44a is provided as the braked portion, either one of the engagement portion and the braked portion is formed in a pin shape, and the structure of the driving body 42 is simple. Thus, improvement in position accuracy regarding movement positions of the opening/closing blades 46, 46, . . . can be achieved while securing further simplification of the structure.

Furthermore, since the cam pin 44a and the braked pin 43a, 43a, . . . are integrally provided to the driving body 42, the cam pin 44a and the braked pins 43a, 43a, . . . are integrally provided as a part of the driving body 42. Thus, improvement in position accuracy regarding the movement positions of the opening/closing blades 46, 46, . . . can be achieved while reducing the number of components.

<Modified Examples of Braking Body>

Hereinafter, a first modified example, a second modified example, and a third modified example of the braking body will be described (see FIGS. 22 to 24).

Figure 22:
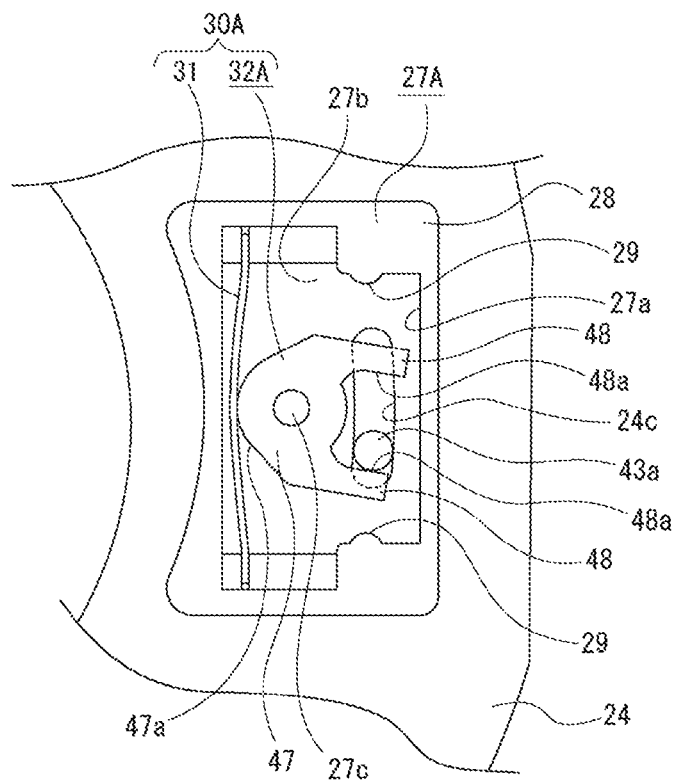
FIG. 22 A schematic rear view showing a braking body and the like according to a first modified example.

A braking body 30A according to the first modified example includes a bias spring 31 and a control member 32A (see FIG. 22).

The bias spring 31 is, for example, a plate spring, and both end portions thereof in a longitudinal direction are connected to a case portion 27A. The case portion 27A includes a support shaft portion 27c that protrudes rearwardly.

The control member 32A is a rotary member and includes a base 47 that is supported by the support shaft portion 27c and braking protrusion portions 48, 48 that protrude from both end portions of the base 47 in the same direction.

The control member 32A is rotatably supported by the base body 21 by using the support shaft portion 27c as a fulcrum. The control member 32A is supported by the base body 21 in a state where a circumferential surface 47a of the base 47 is pressed against the bias spring 31 and the bias spring 31 is bent, and a bias force is applied from the bias spring 31. Facing surfaces of the braking protrusion portions 48, 48 are formed as operation surfaces 48a, 48a.

When the driving body 42 is rotated with respect to the base body 21, since the operation surface 48a is pressed by the braked pin 43a, the control member 32A is rotated, a bias force as a braking force is applied to the driving body 42 from the bias spring 31 via the control member 32A, and the braking force is transmitted to the opening/closing blades 46, 46, . . . from the driving body 42.

In such a manner, in the braking body 30A according to the first modified example, the control member 32A is rotatably supported by the base body 21, the control member 32A is rotated, and the braking force is applied to the opening/closing blades 46, 46, . . . via the driving body 42.

Therefore, an operating space of the control member 32A is made small, and the movement speeds of the opening/closing blades 46, 46, . . . can be reliably controlled while securing the miniaturization of the blade opening/closing apparatus 11.

It should be noted that the braking body 30A can also be configured such that the bias force from the bias spring 31 with respect to the control member 32A increases as the control member 32A approaches rotary ends on both sides, depending on the shape of the control member 32A, the shape of the bias spring 31, a position relationship therebetween, and the like.

Figure 23:
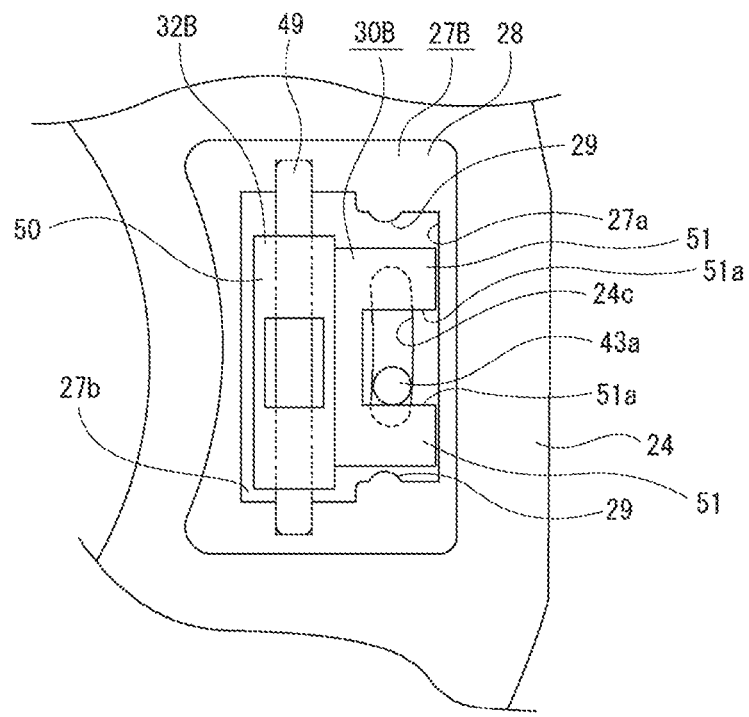
FIG. 23 A schematic rear view showing a braking body and the like according to a second modified example.

A braking body 30B according to the second modified example includes a control member 32B (see FIG. 23).

The control member 32B is moved by being guided by a guide shaft 49. Both end portions of the guide shaft 49 in a longitudinal direction are connected to a case portion 27B.

The control member 32B is a slider and includes a base 50 that is supported by the guide shaft 49 and braking protrusion portions 51, 51 that protrude from both end portions of the base 50 in the same direction. Facing surfaces of the braking protrusion portions 51, 51 are formed as operation surfaces 51a, 51a.

The control member 32B is movably supported by the base body 21 via the guide shaft 49. A viscous material such as grease is applied to an outer circumferential surface of the guide shaft 49, and the control member 32B is guided by the guide shaft 49 and moved in a state where the viscous resistance of the viscous material is applied to the control member 32B.

When the driving body 42 is rotated with respect to the base body 21, since the operation surface 51a is pressed by the braked pin 43a, the control member 32B is rotated, the viscous resistance of the viscous material as a braking force is applied to the driving body 42 via the control member 32B, and the braking force is transmitted to the opening/closing blades 46, 46, . . . from the driving body 42.

In such a manner, in the braking body 30B according to the second modified example, the braking body 30B includes the control member 32B movably supported by the base body 21 and the viscous material that applies the viscous resistance to the control member 32B, and when the braked pin 43a comes into contact with the control member 32B, the viscous resistance of the viscous material as a braking force is applied to the braked pin 43a via the control member 32B.

Therefore, since the braking force is applied to the braked pin 43a brought into contact with the control member 32B from the viscous material via the control member 32B and is transmitted from the driving body 42 to the opening/closing blades 46, 46, . . . , the movement speeds of the opening/closing blades 46, 46, . . . can be reliably controlled by a simple structure.

Further, since the control member 32B is slidably supported by the base body 21, the control member 32B is caused to slide, and the braking force is applied to the opening/closing blades 46, 46, . . . via the driving body 42. The operation of the control member 32B is a simple operation, and the movement speeds of the opening/closing blades 46, 46, . . . can be reliably controlled while securing simplification of the structure.

Furthermore, since the braking force by the viscous resistance increases in proportion to the speed, also in a case where the rotary speeds of the opening/closing blades 46, 46, . . . are high, a sufficient braking force can be secured without enlarging the braking body 30B.

Figure 24:
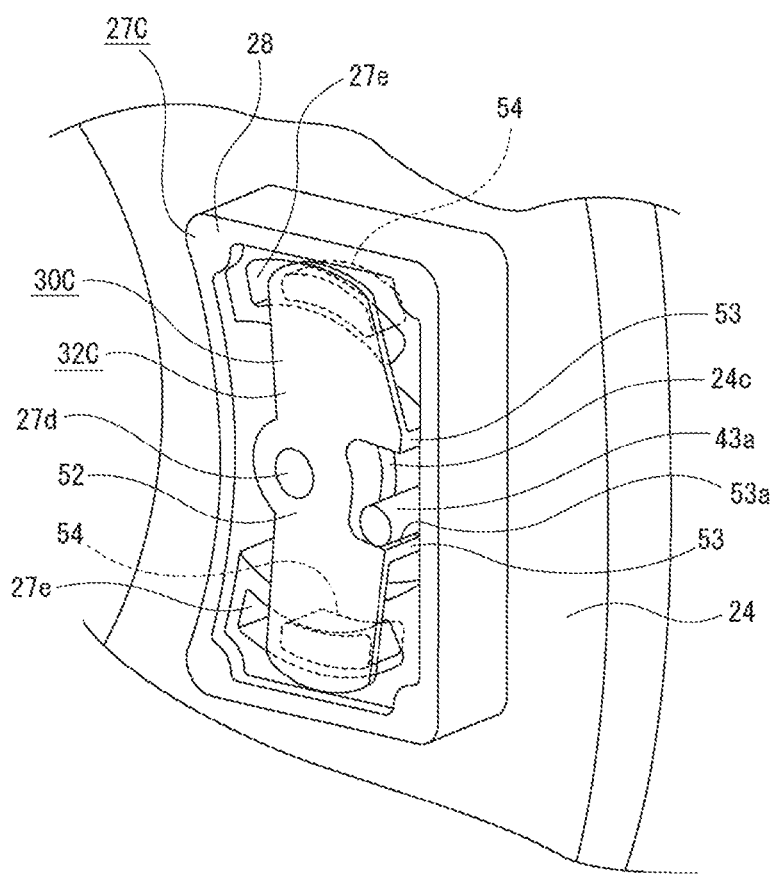
FIG. 24 A schematic perspective view showing a braking body and the like according to a third modified example.
Figure 25:
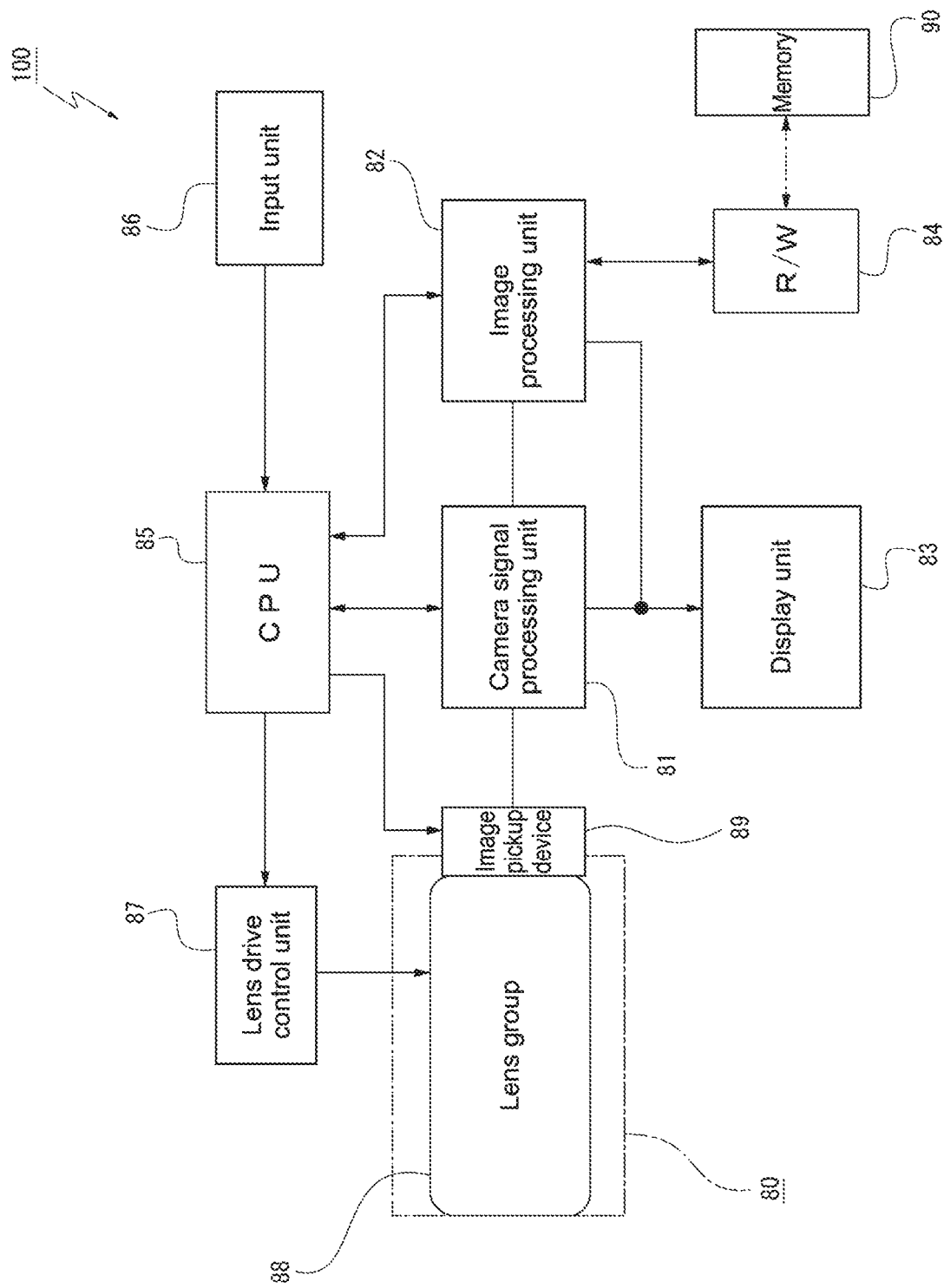
FIG. 25 A block diagram of the image pickup apparatus.

A braking body 30C according to the third modified example includes a control member 32C (see FIG. 24).

The control member 32C is rotatably supported by a case portion 27C. The case portion 27C includes a support shaft portion 27d that protrudes rearwardly. The case portion 27C includes filling concave portions 27e, 27e that are formed at opposite positions sandwiching the support shaft portion 27d therebetween and protrude rearwardly.

The control member 32C is a rotary member and includes a base 52 that is supported by the support shaft portion 27d, braking protrusion portions 53, 53 that protrude from both end portions of the base 52 in the same direction, and insertion protrusion portions 54, 54 that protrude forwardly from both end portions of the base 52.

The control member 32C is rotatably supported by the base body 21 by using the support shaft portion 27d as a fulcrum. In the control member 32C, the insertion protrusion portions 54, 54 are inserted into the filling concave portions 27e, 27e of the case portion 27C.

A viscous material such as grease is filled in the filling concave portions 27e, 27e into which the insertion protrusion portions 54, 54 are inserted. The control member 32C is rotated in a state where the viscous resistance of the viscous material is applied to the control member 32C.

When the driving body 42 is rotated with respect to the base body 21, since an operation surface 53a is pressed by the braked pin 43a, the control member 32C is rotated, the viscous resistance of the viscous material as a braking force is applied to the driving body 42 via the control member 32C, and the braking force is transmitted to the opening/closing blades 46, 46, . . . from the driving body 42.

In such a manner, in the braking body 30C according to the third modified example, the braking body 30C includes the control member 32C rotatably supported by the base body 21 and the viscous material that applies the viscous resistance to the control member 32C, and when the braked pin 43a comes into contact with the control member 32C, the viscous resistance of the viscous material as a braking force is applied to the braked pin 43a via the control member 32C.

Therefore, since the braking force is applied to the braked pin 43a brought into contact with the control member 32C from the viscous material via the control member 32C and is transmitted from the driving body 42 to the opening/closing blades 46, 46, . . . , the movement speeds of the opening/closing blades 46, 46, . . . can be reliably controlled by a simple structure.

Further, since the control member 32C is rotatably supported by the base body 21, the control member 32C is rotated, and the braking force is applied to the opening/closing blades 46, 46, . . . via the driving body 42, an operating space of the control member 32C is made small, and the movement speeds of the opening/closing blades 46, 46, . . . can be reliably controlled while securing the miniaturization of the blade opening/closing apparatus 11.

Furthermore, since the braking force by the viscous resistance increases in proportion to the speed, also in a case where the rotary speeds of the opening/closing blades 46, 46, . . . are high, a sufficient braking force can be secured without enlarging the braking body 30C.

<Others>

Although the example of the blade opening/closing apparatus 11 including the six opening/closing blades 46, 46, . . . has been described above, the number of opening/ closing blades 46 provided to the blade opening/closing apparatus 11 may be arbitrary, and the number may be one or more, other than six.

<One Embodiment of Image Pickup Apparatus>

FIG. 23 is a block diagram showing a still camera (digital still camera) according to an embodiment of an image pickup apparatus of the present technology.

An image pickup apparatus (digital still camera) 100 (image pickup apparatus 1) includes a camera block 80 including an image pickup function, a camera signal processing unit 81 that carries out signal processing such as an analog-digital conversion on captured image signals, and an image processing unit 82 that carries out recording/reproducing processing of the image signals. In addition, the image pickup apparatus 100 includes a display unit 83 (display 7) that displays a captured image and the like, an R/W (reader/writer) 84 that writes and reads out image signals to/from a memory 90, a CPU (Central Processing Unit) 85 that performs overall control of the image pickup apparatus 100, an input unit 86 including various switches and the like, to which necessary operations are performed by a user (shutter button 4, zoom switch 5, power button 6, and operation portions 8, 8, . . . ), and a lens drive control unit 87 that controls drive of lenses arranged in the camera block 80.

The camera block 80 is constituted of an optical system (optical system 10) including a lens group 88, an image pickup device 89 (image pickup device 12) such as CCD (Charge Coupled Device) and CMOS (Complementary Metal-Oxide Semiconductor), and the like.

The camera signal processing unit 81 carries out various types of signal processing such as a conversion into digital signals, noise removal, image quality correction, and conversion into luminance/color difference signals, on output signals from the image pickup device 89.

The image processing unit 82 carries out compression coding/decompression decoding processing on image signals based on a predetermined image data format, processing of converting a specification of data of a resolution and the like, and the like.

The display unit 83 includes a function of displaying various types of data such as an operation state of the user with respect to the input unit 86 and a captured image.

The R/W 84 writes image data encoded by the image processing unit 82 in the memory 90 and reads out image data recorded in the memory 90.

The CPU 85 functions as a control processing unit that controls respective circuit blocks provided in the image pickup apparatus 100, and controls the respective circuit blocks on the basis of an instruction input signal or the like from the input unit 86.

The input unit 86 outputs an instruction input signal corresponding to the user operation to the CPU 85.

The lens drive control unit 87 controls a motor (not shown) that drives each lens of the lens group 88 on the basis of a control signal from the CPU 85, and the like.

The memory 90 is, for example, a semiconductor memory that is detachable from a slot connected to the R/W 84.

Hereinafter, an operation of the image pickup apparatus 100 will be described.

In a photograph standby state, image signals captured by the camera block 80 are output to the display unit 83 via the camera signal processing unit 81 and displayed as a camera-through image under control of the CPU 85. Further, when an instruction input signal for zooming is input from the input unit 86, the CPU 85 outputs a control signal to the lens drive control unit 87, and a predetermined lens of the lens group 88 is moved under control of the lens drive control unit 87.

When a shutter (blade opening/closing apparatus 11) of the camera block 80 is operated by the instruction input signal from the input unit 86, captured image signals are output from the camera signal processing unit 81 to the image processing unit 82 to be subjected to compression coding processing, and the signals are converted into digital data of a predetermined data format. The converted data is output to the R/W 84 and written in the memory 90.

Focusing is carried out by the lens drive control unit 87 moving a predetermined lens of the lens group 88 on the basis of a control signal from the CPU 85.

In a case where image data recorded in the memory 90 is to be reproduced, predetermined image data is read out from the memory 90 by the R/W 84 in accordance with an operation to the input unit 86, and after the image processing unit 82 carries out decompression decoding processing, reproduction image signals are output to the display unit 83 so that a reproduction image is displayed.

<Present Technology>

The present technology can also take the following configurations.

(1)

A blade opening/closing apparatus, including:

a base body that includes an aperture;

a driving body that is movably supported by the base body and is operated by a driving force of a drive source;

an opening/closing blade that is moved by an operation of the driving body and opens/closes the aperture; and a braking body that controls a movement speed of the opening/closing blade via the driving body, the driving body including, on one surface thereof, an engagement portion that is to be engaged with the opening/closing blade and transmits the driving force to the opening/closing blade, the driving body including, on another surface thereof, a braked portion to which a braking force of the braking body is to be applied.

(2)

The blade opening/closing apparatus according to (1), in which the opening/closing blade is moved between an opening position at which the aperture is opened and a closing position at which the aperture is closed, and the braking force is applied to the braked portion from the braking body at a part of a zone between the opening position and the closing position.

(3)

The blade opening/closing apparatus according to (2), in which the braking force is applied to the braked portion from the braking body at an end portion of the zone on a closing position side.

(4)

The blade opening/closing apparatus according to (2), in which the braking force is applied to the braked portion from the braking body at an end portion of the zone on an opening position side.

(5)

The blade opening/closing apparatus according to any one of (1) to (4), in which a cam pin is provided as the engagement portion, and a braked pin is provided as the braked portion, the braked pin protruding in a direction opposite to the cam pin.

(6)

The blade opening/closing apparatus according to any one of (1) to (5), in which the engagement portion and the braked portion are integrally provided to the driving body.

(7)

The blade opening/closing apparatus according to any one of (1) to (6), in which the driving body is formed in an annular shape, and the driving body is rotatably supported by the base body on an outer circumferential side of the aperture.

(8)

The blade opening/closing apparatus according to any one of (1) to (7), in which a plurality of opening/closing blades are provided, at least a part of each of the plurality of opening/closing blades is movable with respect to the base body on an outer circumferential side of the aperture, and the aperture is opened/closed by the plurality of opening/closing blades moving in a direction in which the plurality of opening/closing blades are set apart from the center of the aperture.

(9)

The blade opening/closing apparatus according to (8), in which the base body includes a plurality of stopper portions that restrict movements of the plurality of opening/closing blades, and when the plurality of opening/closing blades simultaneously come into contact with the plurality of stopper portions, the movements of the plurality of opening/closing blades are restricted.

(10)

The blade opening/closing apparatus according to (9), in which the opening/closing blades are moved between the opening position at which the aperture is opened and the closing position at which the aperture is closed, a first stopper portion that stops the opening/closing blades at the opening position and a second stopper portion that stops the opening/closing blades at the closing position are provided as the plurality of stopper portions, and the first stopper portion and the second stopper portion are alternately provided on an outer circumferential portion of the base body in a circumferential direction.

(11)

The blade opening/closing apparatus according to any one of (1) to (10), in which the braking body includes a control member that is movably supported by the base body and a bias spring that biases the control member, and when the braked portion comes into contact with the control member, a bias force of the bias spring as a braking force is applied to the braked portion via the control member.

(12)

The blade opening/closing apparatus according to (11), in which the control member is slidably supported by the base body.

(13)

The blade opening/closing apparatus according to (12), in which the driving body is rotatably supported by the base body, and a sliding direction of the control member is set to a direction tangent to a rotation direction of the driving body.

(14)

The blade opening/closing apparatus according to any one of (1) to (13), in which the bias force applied from the bias spring is increased as the control member approaches both ends of the bias spring in a movement direction.

(15)

The blade opening/closing apparatus according to any one of (11) to (14), in which paired plate springs that are positioned to face each other are used as the bias spring, both end portions of the paired plate springs in a longitudinal direction are connected to the base body, the control member includes pressed portions to which the paired plate springs are pressed from opposite sides, and the bias force in a direction in which the paired plate springs approach each other is applied to the control member.

(16)

The blade opening/closing apparatus according to (11), in which the control member is rotatably supported by the base body.

(17)

The blade opening/closing apparatus according to any one of (1) to (10), in which the braking body includes a control member that is movably supported by the base body and a viscous material that applies viscous resistance to the control member, and when the braked portion comes into contact with the control member, the viscous resistance of the viscous material as a braking force is applied to the braked portion via the control member.

(18)

The blade opening/closing apparatus according to (17), in which the control member is slidably supported by the base body.

(19)

The blade opening/closing apparatus according to (17), in which the control member is rotatably supported by the base body.

(20)

An image pickup apparatus, including:

a blade opening/closing apparatus that controls light taken in inside via an optical system; and an image pickup device that photoelectrically converts the light taken in via the optical system, the blade opening/closing apparatus including a base body that includes an aperture, a driving body that is movably supported by the base body and is operated by a driving force of a drive source, an opening/closing blade that is moved by an operation of the driving body and opens/closes the aperture, and a braking body that controls a movement speed of the opening/closing blade via the driving body, the driving body including, on one surface thereof, an engagement portion that is to be engaged with the opening/closing blade and transmits the driving force to the opening/closing blade, the driving body including, on another surface thereof, a braked portion to which a braking force of the braking body is to be applied.

REFERENCE SIGNS LIST

1 image pickup apparatus
10 optical system 11 blade opening/closing apparatus
12 image pickup device
21 base body
24a aperture
24e first stopper portion
24f second stopper portion
30 braking body
31 bias spring
32 control member
37 pressed portion
40 driving motor
42 driving body
43a braked pin (braked portion)
44a cam pin (engagement portion)
46 opening/closing blade
30A braking body
32A control member
30B braking body
32B control member
30C braking body
32C control member The invention claim is:

1. A blade opening/closing apparatus, comprising:
a base body that includes an aperture;
a driving body that is movably supported by the base body, wherein the driving body is operated by a driving force of a drive source;
an opening/closing blade configured to:
move by an operation of the driving body, and
one of open or close the aperture,
wherein the opening/closing blade moves between an opening position at which the aperture is opened and a closing position at which the aperture is closed; and
a braking body configured to control a movement speed of the opening/closing blade via the driving body, wherein:
the driving body includes an engagement portion on a first surface of the driving body, wherein the engagement portion:
engages with the opening/closing blade, and
transmits the driving force to the opening/closing blade,
the driving body includes a braked portion on a second surface of the driving body, wherein:
a braking force of the braking body is applied to the braked portion, and
the braking force is applied to the braked portion from the braking body at a part of a zone between the opening position and the closing position.

2. The blade opening/closing apparatus according to claim 1, wherein the braking force is applied to the braked portion from the braking body at an end portion of the zone on a closing position side.

3. The blade opening/closing apparatus according to claim 1, wherein the braking force is applied to the braked portion from the braking body at an end portion of the zone on an opening position side.

4. The blade opening/closing apparatus according to claim 1, wherein:
a cam pin is the engagement portion,
a braked pin is the braked portion, and
the braked pin protrudes in a direction opposite to the cam pin.

5. The blade opening/closing apparatus according to claim 1, wherein
the engagement portion and the braked portion are integral to the driving body.

6. The blade opening/closing apparatus according to claim 1, wherein:
the driving body is an annular shape, and
the driving body is rotatably supported by the base body on an outer circumferential side of the aperture.

7. The blade opening/closing apparatus according to claim 1, further comprising a plurality of opening/closing blades, wherein:
at least a part of each of the plurality of opening/closing blades is movable with respect to the base body on an outer circumferential side of the aperture, and
the aperture is one of opened or closed, by the plurality of opening/closing blades configured to move in a direction in which the plurality of opening/closing blades are set apart from a center of the aperture.

8. The blade opening/closing apparatus according to claim 7, wherein:
the base body includes a plurality of stopper portions that restrict movements of the plurality of opening/closing blades, and
the movements of the plurality of opening/closing blades are restricted when the plurality of opening/closing blades concurrently come into contact with the plurality of stopper portions.

9. The blade opening/closing apparatus according to claim 8, wherein:
the plurality of opening/closing blades are moved between the opening position at which the aperture is opened and the closing position at which the aperture is closed,
a first stopper portion that stops the plurality of opening/closing blades at the opening position and a second stopper portion that stops the plurality of opening/closing blades at the closing position are the plurality of stopper portions, and
the first stopper portion and the second stopper portion are alternately on an outer circumferential portion of the base body in a circumferential direction.

10. The blade opening/closing apparatus according to claim 1, wherein:
the braking body includes:
a control member that is movably supported by the base body, and
a bias spring configured to bias the control member, and
a bias force of the bias spring is applied to the braked portion as the braking force via the control member when the braked portion comes into contact with the control member.

11. The blade opening/closing apparatus according to claim 10, wherein
the control member is slidably supported by the base body.

12. The blade opening/closing apparatus according to claim 11, wherein
the driving body is rotatably supported by the base body, and
a sliding direction of the control member is set to a direction tangent to a rotation direction of the driving body.

13. The blade opening/closing apparatus according to claim 10, wherein
the bias force applied from the bias spring is increased as the control member approaches both ends of the bias spring in a movement direction.

14. The blade opening/closing apparatus according to claim 10, wherein paired plate springs that are positioned to face each other are the bias spring, both end portions of the paired plate springs in a longitudinal direction are connected to the base body, the control member includes pressed portions to which the paired plate springs are pressed from opposite sides, and the bias force in a direction in which the paired plate springs approach each other is applied to the control member.

15. The blade opening/closing apparatus according to claim 10, wherein the control member is rotatably supported by the base body.

16. The blade opening/closing apparatus according to claim 1, wherein:

the braking body includes:
a control member that is movably supported by the base body, and
a viscous material configured to apply viscous resistance to the control member, and the viscous resistance of the viscous material is applied to the braked portion as the braking force via the control member when the braked portion comes into contact with the control member.

17. The blade opening/closing apparatus according to claim 16, wherein the control member is slidably supported by the base body.

18. The blade opening/closing apparatus according to claim 16, wherein the control member is rotatably supported by the base body.

19. An image pickup apparatus, comprising:

a blade opening/closing apparatus configured to control light taken in inside via an optical system; and an image pickup device configured to photoelectrically convert the light taken in via the optical system, wherein the blade opening/closing apparatus includes:
a base body that includes an aperture,
a driving body that is movably supported by the base body, wherein the driving body is operated by a driving force of a drive source,
an opening/closing blade configured to:
move by an operation of the driving body, and
one of open or close the aperture,
wherein the opening/closing blade moves between an opening position at which the aperture is opened and a closing position at which the aperture is closed, and
a braking body configured to control a movement speed of the opening/closing blade via the driving body, wherein:
the driving body includes an engagement portion on a first surface of the driving body, wherein the engagement portion:
engage with the opening/closing blade, and
transmits the driving force to the opening/closing blade,
the driving body includes a braked portion on a second surface of the driving body, wherein:
a braking force of the braking body is applied to the braked portion, and
the braking force is applied to the braked portion from the braking body at a part of a zone between the opening position and the closing position.

20. A blade opening/closing apparatus, comprising:

a base body that includes an aperture;

a driving body that is movably supported by the base body, wherein the driving body is operated by a driving force of a drive source;

an opening/closing blade configured to:
move by an operation of the driving body, and
one of open or close the aperture; and a braking body configured to control a movement speed of the opening/closing blade via the driving body, wherein:
the braking body includes:
a control member that is movably supported by the base body, and
a bias spring configured to bias the control member, and
the driving body includes an engagement portion on a first surface of the driving body, wherein the engagement portion:
engages with the opening/closing blade, and
transmits the driving force to the opening/closing blade, and
the driving body includes a braked portion on a second surface of the driving body, wherein:
a bias force of the bias spring is applied to the braked portion as a braking force via the control member when the braked portion comes into contact with the control member, and
the bias force applied from the bias spring is increased as the control member approaches both ends of the bias spring in a movement direction.

21. A blade opening/closing apparatus, comprising:

a base body that includes an aperture;

a driving body that is movably supported by the base body, wherein the driving body is operated by a driving force of a drive source;

an opening/closing blade configured to:
move by an operation of the driving body, and
one of open or close the aperture; and a braking body configured to control a movement speed of the opening/closing blade via the driving body, wherein:
the braking body includes:
a control member that is movably supported by the base body, and
a viscous material configured to apply viscous resistance to the control member,
the driving body includes an engagement portion on a first surface of the driving body, wherein the engagement portion:
engages with the opening/closing blade, and
transmits the driving force to the opening/closing blade, and
the driving body includes a braked portion on a second surface of the driving body, wherein:
the viscous resistance of the viscous material is applied to the braked portion as a braking force via the control member when the braked portion comes into contact with the control member.

* * * * *